United States Patent
Konishi et al.

(10) Patent No.: US 6,172,840 B1
(45) Date of Patent: Jan. 9, 2001

(54) MAGNETIC RECORDING/REPRODUCTION APPARATUS INCLUDING A ROTARY HEAD CYLINDER AND BOTH VERTICAL AND INCLINED GUIDES FOR WINDING A MAGNETIC TAPE ABOUT THE ROTARY HEAD CYLINDER

(75) Inventors: Akio Konishi, Sanda; Koichiro Hirabayashi, Hirakata; Hitoshi Yasutomi, Daito, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/268,904

(22) Filed: Mar. 15, 1999

(30) Foreign Application Priority Data

Mar. 19, 1998 (JP) .................................. 10-070178

(51) Int. Cl.[7] .................................. G11B 15/665
(52) U.S. Cl. .................................. 360/85; 360/84; 360/95
(58) Field of Search .................................. 360/84, 85, 95, 360/107, 108, 109, 130.23, 130.24, 93, 96.1, 96.5; 242/335, 338.4

(56) References Cited

U.S. PATENT DOCUMENTS

| | | | |
|---|---|---|---|
| 4,358,797 | 11/1982 | Nishijima et al. | 360/14.2 |
| 4,491,885 | 1/1985 | Morikawa et al. | 360/85 |
| 4,530,038 | 7/1985 | Narita | 360/74.1 |
| 4,591,935 | 5/1986 | Kouda | 360/96.3 |
| 4,685,008 | 8/1987 | Ohyama | 360/85 |
| 4,951,164 | 8/1990 | Yasaka et al. | 360/85 |
| 5,070,422 | 12/1991 | Sasaki et al. | 360/85 |
| 5,101,311 | 3/1992 | Richmond et al. | 360/85 |
| 5,159,506 | 10/1992 | Eino et al. | 360/74.1 |
| 5,184,262 | 2/1993 | Watanabe et al. | 360/96.2 |
| 5,206,771 | 4/1993 | Katou et al. | 360/71 |

(List continued on next page.)

FOREIGN PATENT DOCUMENTS

| | | |
|---|---|---|
| 61-195552 | 12/1986 | (JP) . |
| 61-203443 | 12/1986 | (JP) . |
| 63-007550 | 1/1988 | (JP) . |

(List continued on next page.)

OTHER PUBLICATIONS

U.S. application No. 09/268,906 filed Mar. 3, 1999.
U.S. application No. 09/266,315 filed Mar. 11, 1999.
U.S. application No. 09/270,478 filed Mar. 15, 1999.
U.S. application No. 09/266,314 filed Mar. 11, 1999.
U.S. application No. 09/270,238 filed Mar. 15, 1999.
U.S. application No. 09/268,262 filed Mar. 15, 1999.

(List continued on next page.)

Primary Examiner—Jefferson Evans
(74) Attorney, Agent, or Firm—Renner, Otto, Boisselle & Sklar, LLP

(57) ABSTRACT

An apparatus of the present invention is a magnetic recording/reproduction apparatus for pulling out a magnetic tape from a tape cassette and winding the magnetic tape around a rotary head cylinder, having a rotary head, for a predetermined arc, for recording/reproducing the magnetic tape. The magnetic recording/reproduction apparatus includes: a rotary head cylinder; a first base member on which the tape cassette is mounted; a second base member for guiding a reciprocal movement of the first bane member toward/away from the rotary head cylinder; first to fifth vertical posts for guiding the magnetic tape, wherein a winding contact line, along which the magnetic tape contacts each of the first to fifth vertical posts, is perpendicular to a tape driving direction in which the magnetic tape is driven; and first to third inclined posts for guiding the magnetic tape, wherein a winding contact line, along which the magnetic tape contacts each of the first to third inclined posts, is not perpendicular to the tape driving direction.

4 Claims, 37 Drawing Sheets

U.S. PATENT DOCUMENTS

| | | |
|---|---|---|
| 5,262,909 | 11/1993 | Chiou et al. .................... 360/85 |
| 5,307,221 | 4/1994 | Mikawa et al. ................. 360/96.3 |
| 5,313,345 | 5/1994 | Schandl et al. ................. 360/85 |
| 5,327,306 | 7/1994 | Kondo et al. .................... 360/96.5 |
| 5,395,067 | 3/1995 | Kano et al. ..................... 242/344 |
| 5,438,468 | 8/1995 | Hasegawa et al. ............. 360/107 |
| 5,446,337 | 8/1995 | Kwon ............................. 242/334.6 |
| 5,546,259 | 8/1996 | Iwata et al. ..................... 360/130.22 |
| 5,609,310 | 3/1997 | Kobayashi ...................... 242/334.6 |
| 5,650,888 | 7/1997 | Kuwajima ...................... 360/96.1 |
| 5,689,385 | 11/1997 | Koguchi et al. ................. 360/85 |
| 5,697,568 | 12/1997 | Ishi ................................. 242/336.6 |
| 5,699,208 | 12/1997 | Kim ................................ 360/85 |
| 5,701,214 | 12/1997 | Inoue et al. ..................... 360/71 |
| 5,719,728 | 2/1998 | Miyazaki et al. ............... 360/105 |
| 5,726,827 * | 3/1998 | Moriyama ....................... 360/85 |
| 5,757,570 | 5/1998 | Kiriyama et al. ............... 360/71 |
| 5,772,142 | 6/1998 | Ahn ................................ 242/334.8 |
| 5,790,342 * | 8/1998 | Konishi et al. .................. 360/95 |
| 5,859,744 | 1/1999 | Kim et al. ....................... 360/85 |
| 5,953,185 | 9/1999 | Lee .................................. 360/130.23 |
| 5,963,394 * | 10/1999 | Yamabuchi et al. ............ 360/85 |
| 6,008,963 * | 12/1999 | Nemoto et al. .................. 360/85 |

FOREIGN PATENT DOCUMENTS

| | | |
|---|---|---|
| 3-207046 | 9/1991 | (JP) . |
| 4-129054 | 4/1992 | (JP) . |
| 5-020748 | 1/1993 | (JP) . |
| 5-028600 | 2/1993 | (JP) . |
| 6-036424 | 2/1994 | (JP) . |
| 6-131763 | 5/1994 | (JP) . |
| 6-203431 | 7/1994 | (JP) . |
| 6-215455 | 8/1994 | (JP) . |
| 7-282427 | 10/1995 | (JP) . |
| 7-296347 | 11/1995 | (JP) . |
| 2627465 | 4/1997 | (JP) . |

OTHER PUBLICATIONS

U.S. application No. 09/270,237 filed Mar. 15, 1999.
U.S. application No. 09/266,363 filed Mar. 11, 1999.
U.S. application No. 09/268,909 filed Mar. 15, 1999.
U.S. application No. 09/266,316 filed Mar. 11, 1999.
PTO–892 Form from Office Action dated Approximately Aug. 15, 2000 for USSN 09/266,314.
PTO–892 Form from Office Action dated Approximately Jul. 21, 2000 for USSN 09/266,316.
PTO–892 Form from Office Action dated Jul. 26, 2000 for USSN 09/266,363.
PTO–892 Form from Office Action dated Jul. 18, 2000 for USSN 09/268, 906.
PTO–892 Form from Notice of Allowance dated Jun. 5, 2000 for USSN 09/266,315.
PTO–892 Form from Notice of Allowance dated Aug. 22, 2000 for USSN 09/270,238.
PTO–892 Form from Office Action dated Jul. 18, 2000 for USSN 09/268,906.
PTO–892 Form from Office Action dated Jul. 26, 2000 for USSN 09/268,909.
PTO–892 Form from Office Action dated Jul. 27, 2000 for USSN 09/270,237.
PTO–892 Form from Office Action dated Jul. 28, 2000 for USSN 09/270,478.
PTO–892 Form from Notice Allowance dated Jun. 5, 2000 for USSN 09/265,315.
PTO–892 Form from Office Action dated Jun. 21, 2000 for USSN 09/282,262.

* cited by examiner

MAGNETIC RECORDING/REPRODUCTION APPARATUS INCLUDING A ROTARY HEAD CYLINDER AND BOTH VERTICAL AND INCLINED GUIDES FOR WINDING A MAGNETIC TAPE ABOUT THE ROTARY HEAD CYLINDER

BACKGROUND OF THE INVENTION

1. Field of the Invention

The present invention relates to a magnetic recording/reproduction apparatus.

2. Description of the Related Art

FIG. 40A illustrates an M loading tape path of a conventional magnetic recording/reproduction apparatus.

The magnetic recording/reproduction apparatus illustrated in FIG. 40A includes a chassis 501 and a cylinder 503 having a rotary magnetic head. The magnetic recording/reproduction apparatus records/reproduces signals to/from a tape 505 of a cassette 502 while winding the tape 505 around the cylinder 503. In FIG. 40A, the tape 505 is wound around the cylinder 503 for a predetermined arc.

FIG. 40B illustrates the magnetic recording/reproduction apparatus of FIG. 40A as viewed from a direction indicated by an arrow A.

Referring to FIG. 40B, the magnetic recording/reproduction apparatus having the tape path as illustrated In FIG. 40A needs a predetermined gap of at least δ1 so that a lid 504 of the cassette 502 does not contact the upper surface of the cylinder 503.

Moreover, the magnetic recording/reproduction apparatus having such a structure as illustrated in FIG. 40A needs a predetermined gap δ2 so as to avoid interference between the lid 504 of the cassette 502 and the cylinder 503. The gap δ2 may inhibit downsizing of the tape path and the mechanism.

In the M loading tape path as illustrated in FIG. 40A, the tape 505 is wound around the cylinder 503 in a spiral pattern, as illustrated in FIGS. 41A and 41B, wherein a portion 508 of a lead 507 for guiding the tape 505 is higher than a lower edge 506 of the tape 505 in the cassette 502 by h1.

Therefore, in a loading operation in which the tape 505 is pulled out from the cassette 502 and wound around the cylinder 503, the tape 505 is raised from a position 505a to a position 505b, thereby hooking the tape 505 on the lead 507.

In an unloading operation in which the tape 505 is unwound from the cylinder 503 and pulled back into the cassette 502, the tape 505 is lowered from the position 505b to the position 505a, thereby unhooking, or disengaging, the tape 505 from the lead 507.

Thus, in the magnetic recording/reproduction apparatus having the structure as illustrated in FIG. 40A, the tape 505 may be damaged during the loading/unloading operation in which the tape 505 is hooked/unhooked on/from the lead 507.

Particularly for a thin tape which is required for a long-time and/or digitalized recording operation, the hooking or mounting of the tape 505 on the lead 507 may cause greater damage to the tape 505.

In order to avoid damage to the tape 505, it is necessary to finely adjust the tension acting upon the tape 505 in the loading/unloading operation. Various other problems may also occur. For example, it may be necessary to maintain a high dimensional accuracy for the members for pulling out the tape. These factors may complicate the mechanism and therefore inhibit downsizing of the mechanism.

SUMMARY OF THE INVENTION

According to one aspect of this invention, a magnetic recording/reproduction apparatus is provided for pulling out a magnetic tape from a tape cassette and winding the magnetic tape around a rotary head cylinder, having a rotary head, for a predetermined arc, for recording/reproducing the magnetic tape. The magnetic recording/reproduction apparatus includes: a rotary head cylinder; a first base member on which the tape cassette is mounted; a second base member for guiding a reciprocal movement of the first base member toward/away from the rotary head cylinder; first to fifth vertical posts for guiding the magnetic tape, wherein a winding contact line, along which the magnetic tape contacts each of the first to fifth vertical posts, is perpendicular to a tape driving direction in which the magnetic tape is driven; and first to third inclined posts for guiding the magnetic tape, wherein a winding contact line, along which the magnetic tape contacts each of the first to third inclined posts, is not perpendicular to the tape driving direction. In a tape driving state in which the magnetic tape can be driven, the magnetic tape pulled out from a supply reel is wound around the first vertical post on a non-magnetic side thereof, around the second vertical post on a magnetic side thereof, around the third vertical post on the non-magnetic side thereof, around the first inclined post on the non-magnetic side thereof, around the rotary head cylinder on the magnetic side thereof, around the second inclined post on the non-magnetic side thereof, around the fourth vertical post on the non-magnetic side thereof, around the third inclined post on the magnetic side thereof, around a capstan shaft for driving the magnetic tape on the magnetic side thereof, and around the fifth vertical post on the non-magnetic side thereof, thereby reaching a take-up reel. The rotary head cylinder includes an upper fixed cylinder, an intermediate rotary cylinder having the rotary head and a lower fixed cylinder. The upper fixed cylinder, the intermediate rotary cylinder and the lower fixed cylinder are coaxially aligned with respect to one another. An upper portion of the upper fixed cylinder is cut off so that a cassette lid provided over an opening of the tape cassette does not interfere with the upper fixed cylinder in the tape driving state. The tape driving state is achieved by mounting the tape cassette onto the first base member, moving the first base member toward the rotary head cylinder, pulling out the magnetic tape from the tape cassette by means of a tape guide member, and winding the magnetic tape around the rotary head cylinder, for a predetermined arc, thereby forming a tape drive system to allow the magnetic tape to be recorded/reproduced.

In one embodiment of the invention, the third inclined post is formed integrally with a capstan housing which serves as a bearing member for receiving the capstan shaft.

In another embodiment of the invention, a stop member is provided in an upper portion of a capstan housing which serves as a bearing member for receiving the capstan shaft, the stop member preventing the cassette lid from contacting the upper fixed cylinder.

In still another embodiment of the invention, the magnetic recording/reproduction apparatus further includes: a first vertical post holding arm for holding the first vertical post, the first vertical post holding arm having its pivotal shaft on the first base member; a fifth vertical post holding arm for holding the fifth vertical post, the fifth vertical post holding arm having its pivotal shaft on the first base member; a first tape guide member carrier on which the third vertical post and the first inclined post are mounted; a second tape guide member carrier on which the fourth vertical post and the second inclined post are mounted, wherein the first guide member carrier is guided by a first guiding section provided integrally with the second base member, and also the second tape guide member carrier is guided by a second guiding section provided integrally with the second base member; and a pinch arm pivotally supported on the second base member, the pinch arm having a pinch roller for pressing the magnetic tape against the capstan shaft. The second vertical post and the third inclined post are provided integrally with the second base member.

Thus, the invention described herein makes possible the advantage of providing a magnetic recording/reproduction apparatus incorporating a reliable and smaller mechanism in which damage to a tape during a loading/unloading operation is eliminated while the tape path is minimized by minimizing a gap between a cylinder and a cassette.

This and other advantages of the present invention will become apparent to those skilled in the art upon reading and understanding the following detailed description with reference to the accompanying figures.

DESCRIPTION OF THE PREFERRED EMBODIMENTS

Figure 1:
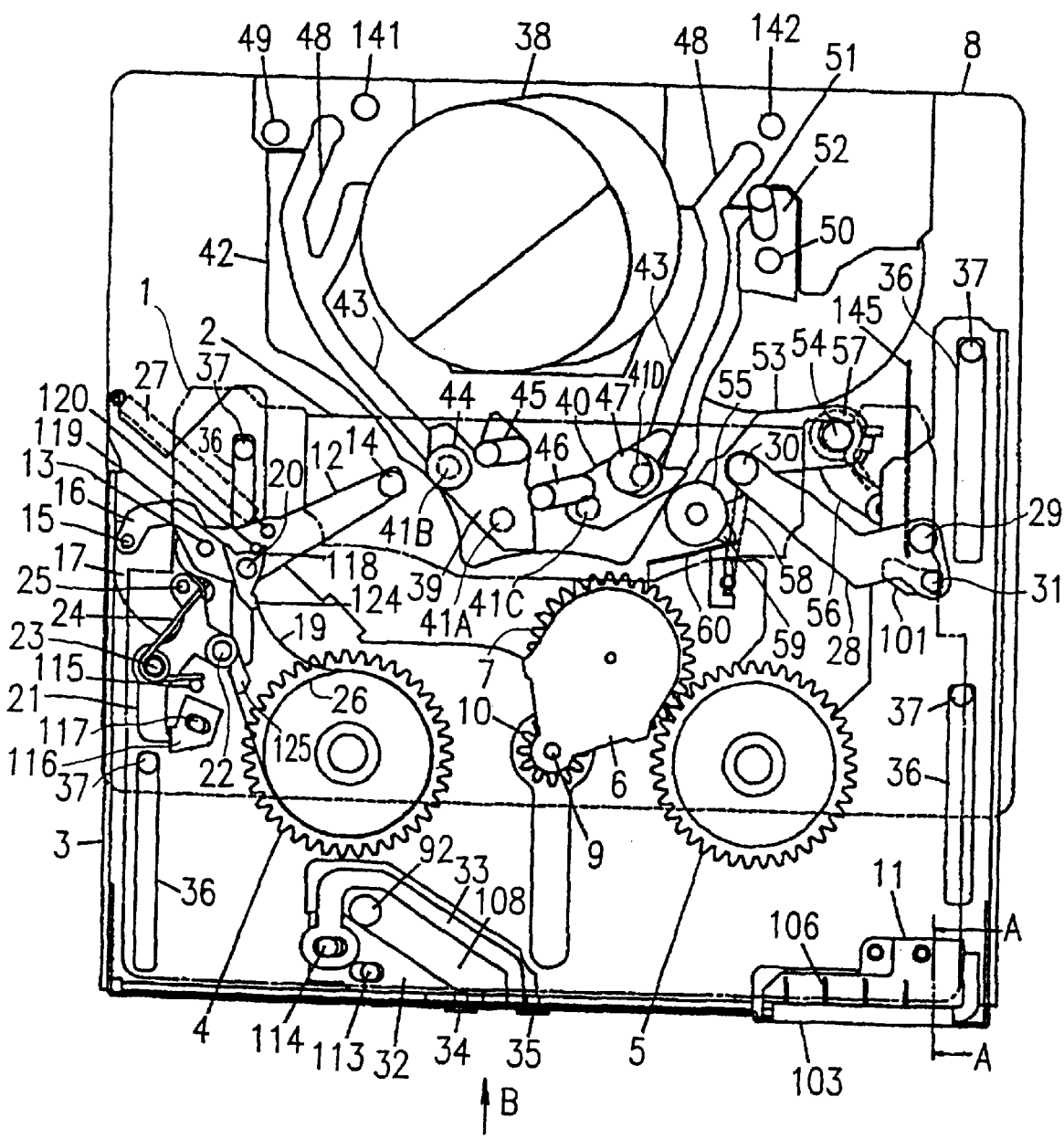
FIG. 1 is a plan view illustrating a magnetic recording/reproduction apparatus according to an embodiment of the present invention in an unloaded mode where a cassette is removed therefrom.

A magnetic recording/reproduction apparatus according to an embodiment of the present invention will now be described with reference to FIGS. 1 to 39, The magnetic recording/reproduction apparatus of the present embodiment pulls out a magnetic tape from a cassette and winds the magnetic tape around a rotary head cylinder, having a rotary head, for a predetermined arc, for recording/reproducing signals to/from the magnetic tape.

The magnetic recording/reproduction apparatus includes: a rotary head cylinder; a first base member on which the tape cassette is mounted; a second base member for guiding a reciprocal movement of the first base member toward/away from the rotary head cylinder; first to fifth vertical posts for guiding the magnetic tape, wherein a winding contact line, along which the magnetic tape contacts each of the first to fifth vertical posts, is perpendicular to a tape driving direction in which the magnetic tape is driven; and first to third inclined posts for guiding the magnetic tape, wherein a winding contact line, along which the magnetic tape contacts each of the first to third inclined posts, is not perpendicular to the tape driving direction.

The rotary head cylinder includes an upper fixed cylinder, an intermediate rotary cylinder having the rotary head and a lower fixed cylinder.

An upper portion of the upper fixed cylinder is cut off so that a cassette lid provided over an opening of the tape cassette does not interfere with the upper fixed cylinder in the tape driving state. Thus, it is possible to minimize the size of the tape path by minimizing the gap between the cylinder and the cassette, and to provide a magnetic recording/reproduction apparatus incorporating a reliable and smaller mechanism.

The tape driving state is achieved by mounting the tape cassette onto the first base member, moving the first base member toward the rotary head cylinder, pulling out the magnetic tape from the tape cassette by means of a tape guide member, and winding the magnetic tape around the rotary head cylinder, for a predetermined arc, thereby forming a tape drive system to allow the magnetic tape to be recorded/reproduced.

In a tape driving state in which the magnetic tape can be driven, the magnetic tape pulled out from a supply reel is wound around the first vertical post on a non-magnetic side thereof, around the second vertical post on a magnetic side thereof, around the third vertical post on the non-magnetic side thereof, around the first inclined post on the non-magnetic side thereof, around the rotary head cylinder on the magnetic side thereof, around the second inclined post on the non-magnetic side thereof, around the fourth vertical post on the non-magnetic side thereof, around the third inclined post on the magnetic side thereof, around a capstan shaft for driving the magnetic tape on the magnetic side thereof, and around the fifth vertical post on the non-magnetic side thereof, thereby reaching a take-up reel.

The "recording/reproduct" of a magnetic tape as used herein means at least one of recording data on the magnetic tape and reproducing data from the magnetic tape. Moreover, "data" as used herein includes at least one of image data, sound data, time data, location data, control data and program data. The "tape cassette" as used herein includes any type of cassette to/from which data can be recorded/reproduced, such as a DVC (digital video cassette), an 8 mm video cassette, a VHS cassette, and the like.

The magnetic recording/reproduction apparatus of the present invention will now be described in detail with reference to FIGS. 1 to 39.

FIG. 1 is a plan view illustrating the present embodiment of the invention in a position where a cassette is unloaded (hereinafter, referred to also as the "unloaded mode"). For the sake of simplicity, some elements of the magnetic recording/reproduction apparatus are not shown in FIG. 1.

A tape 2 is wound around two reels (not shown) housed in a cassette 1, so that a portion of the tape 2 between the reels is placed under tension. In the Figures, the cassette 1 is illustrated only by its profile in a one dot chain line, and a portion of the tape 2 existing outside the cassette 1 is also shown in a one dot chain line, for the sake of simplicity.

The cassette 1 is attached to a subchassis 3. An S reel base 4 and a T reel base 5, which are rotatably provided on the subchassis 3, are engaged with the reels (not shown) in the cassette 1.

An idler gear 7 is axially supported on an idler 6. The idler 6 is provided rotatably with respect to the center gear shaft 9, which is provided on a main chassis 8. The center gear 10 is provided rotatably with respect to the center gear shaft 9. The idler gear 7 is rotated by the center gear 10 to be engaged with gears around the S reel base 4 and the T reel base 5, thereby rotating the gears around the S reel base 4 and the T reel base 5. A memory-in-cassette reading switch (hereinafter, referred to simply as the "MIC-SW") 11 is provided in the subchassis 3.

Figure 2:
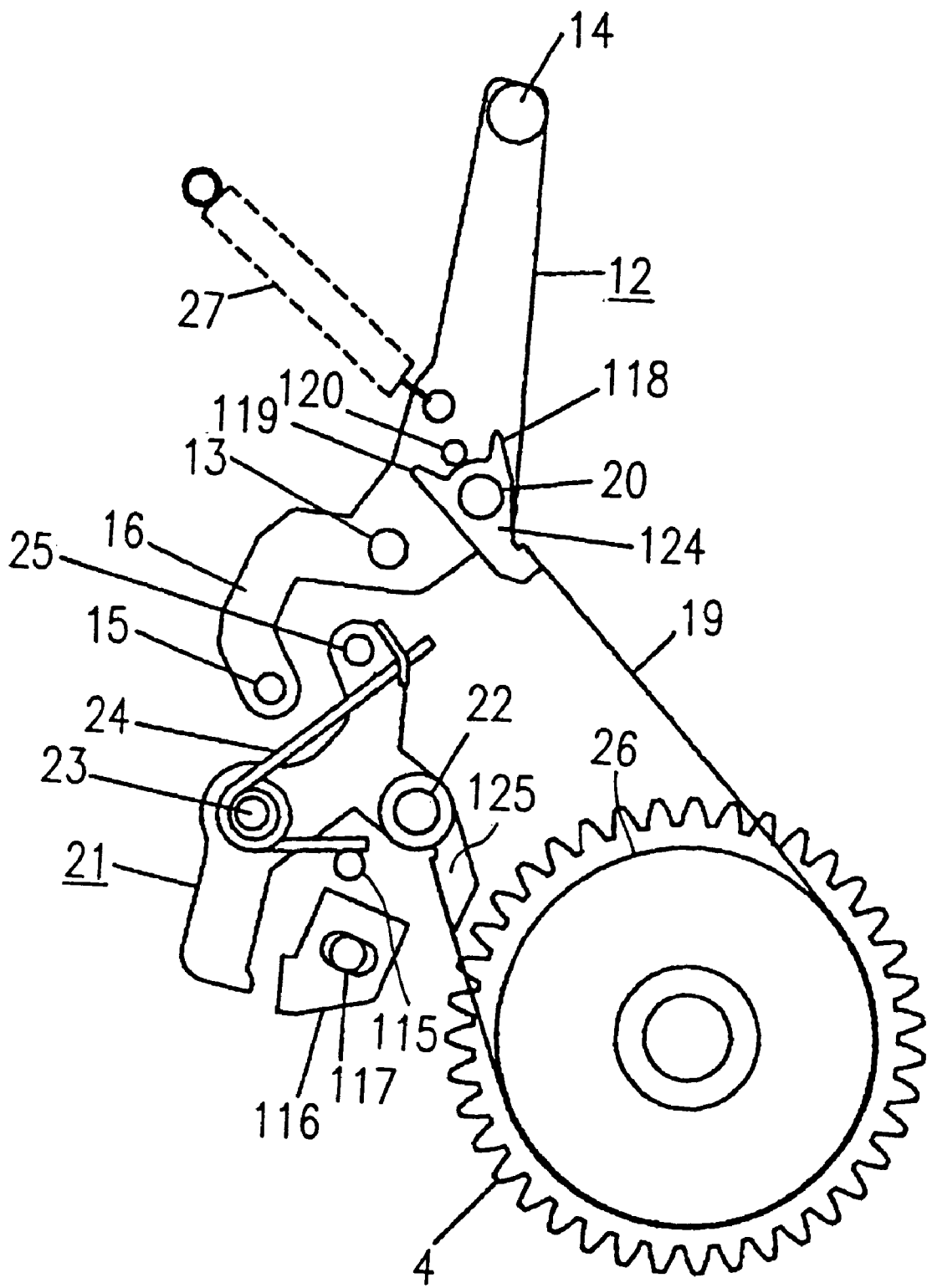
FIG. 2 is a detailed plan view illustrating a tension arm and peripheral elements of the magnetic recording/reproduction apparatus.

FIG. 2 illustrates in detail a tension arm 12 and the peripheral elements thereof.

Referring to FIGS. 1 and 2, the tension arm 12 is provided in the subchassis 3 to be rotatable about a tension arm shaft 13. A tension post 14 is provided on one end of the tension arm 12. A tension arm regulating pin 15 provided on an end 16 of the tension arm 12 passes through a hole 17 provided in the subchasses 3 to be engaged with a tension plate 18 (FIG. 3) on the main chassis 8 for regulating the movement of the tension arm 12. The tension plate 18 is not shown in FIG. 1.

An end 124 of a tension band 19 is axially supported about a shaft 20 on the tension arm 12. The other end 125 of the tension band 19 is axially supported about a shaft 22 on a tension band regulating arm 21. The tension band regulating arm 21 is axially supported about a shaft 23 on the subchassis 3, and is biased in the counterclockwise direction by a twisted coil spring 24. A spring peg 115 is provided on the subchassis 3 for the twisted coil spring 24. A tension arm stop plate 116 is fixed by a screw (not shown) on the subchassis 3 in apredetermined adjusted position 117. The movement (and thus the position) of the tension band regulating arm 21 is regulated by contacting the tension arm stop plate 116.

A pin 25 is provided in the tension band regulating arm 21. The pin 25 passes through the hole 17 in the subchassis 3 to be engaged with the tension plate 18 for regulating the movement of the tension band regulating arm 21. The tension band 19 is wound around a cylindrical portion 26 of the S reel base 4. The tension arm 12 is biased in the counterclockwise direction by a tension spring 27. An end of the tension spring 27 is hooked around a spring peg provided in the subchassis 3.

in the present embodiment of the invention, all the tension springs are shown only by their profiles in a broken line for the sake of simplicity. A protrusion A 118 and a protrusion B 119 are provided at the end 124 of the tension band 19. A band regulating protrusion 120 provided in the tension arm 12 regulates the movement of the tension band 19 by contacting and pushing back the protrusion A 118 and the protrusion B 119 so as to prevent the tension band 19 from slacking and thus dropping off the S reel base 4.

in FIG. 1, a T4 arm 28 is axially supported about a shaft 29 on the subchassis 3. A T4 post 30 is provided on an end of the T4 arm 28, and a T4 arm regulating pin 31 is provided on the other end thereof. The T4 arm 28 is biased in the counterclockwise direction by a spring (not shown).

A cam A plate 32 and a cam B plate 33 are attached to the subchassis 3 by means of pins 34 and 35 so as to be movable in the left/right direction (in the plane of FIG. 1). The cam A plate 32 and the cam B plate 33 are fixed to the subchassis 3 by means of screws (not shown) after their positions are adjusted.

The subchassis 3 includes four elongated holes 36 which are engaged with four axes 37 provided on the main chassis 8, thereby supporting the subchassis 3 so that the subchassis 3 can move in the forward/backward direction (in the plane of the figure) along the four elongated holes 36.

The tape 2 is wound around a cylinder 38 with a rotary magnetic head provided on the main chassis 8, whereby the apparatus is ready to record/reproduce signals (data) to/from the tape 2.

Pins 41A, 41B and 41C, 41D provided in an S boat 39 and a T boat 40, respectively, are engaged with elongated holes 43 of a rail 42, so that the S boat 39 and the T boat 40 move along the elongated holes 43. An S1 post 45 and an S2 post 44 are provided on the S boat 39, and a T1 post 46 and a T2 post 47 are provided on the T boat 40. The tape 2 is wound around the cylinder 38 along with the movement of the S boat 39 and the T boat 40.

A rail portion 48 is provided on the main chassis 8, and an S3 post 49 is also provided on the main chassis 8. A T3 post 51 is provided in a capstan housing 52 holding a capstan 50.

A pinch arm 53 is axially supported about a pivotal shaft 54 on the main chassis 8. A pinch roller 55 is rotatably provided on an end of the pinch arm 53. A pinch press arm 56 is coaxial with the pivotal shaft 54 of the pinch arm 53, and is biased by a twisted coil spring 57 together with the pinch arm 53. A tension spring 58 is placed under tension between the pinch arm 53 and the subchassis 3 for biasing the pinch arm 53 in the counterclockwise direction. A protrusion 59 of the pinch arm 53 contacts a wall portion 60 of the subchassis 3, thereby driving the pinch arm 53 along with the movement of the subchassis 3.

An exemplary structure of the main chassis a will be described with reference to FIG. 3.

Figure 3:
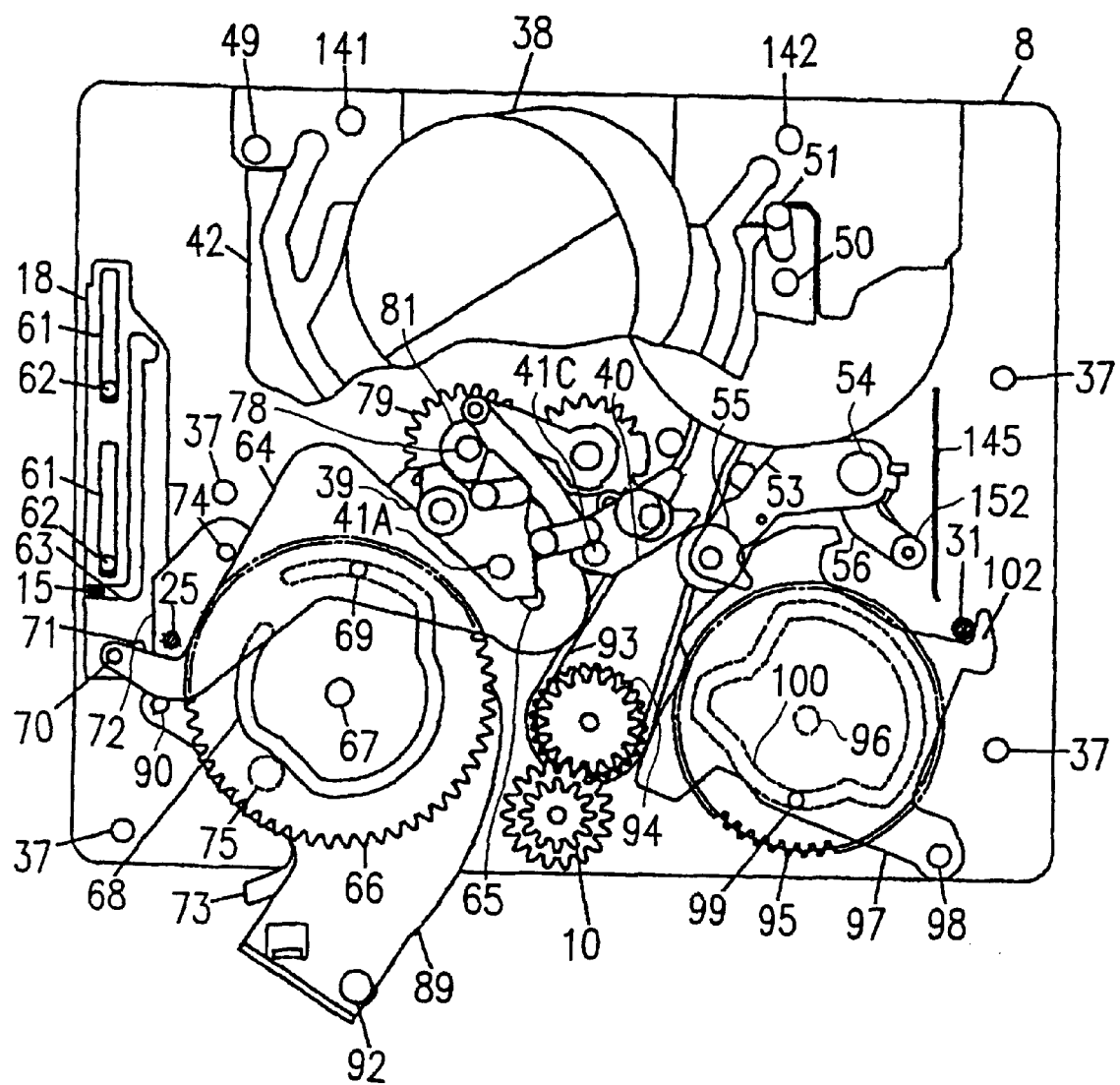
FIG. 3 is a plan view illustrating the magnetic recording/reproduction apparatus in the unloaded mode with a subchassis being removed.
Figure 4:
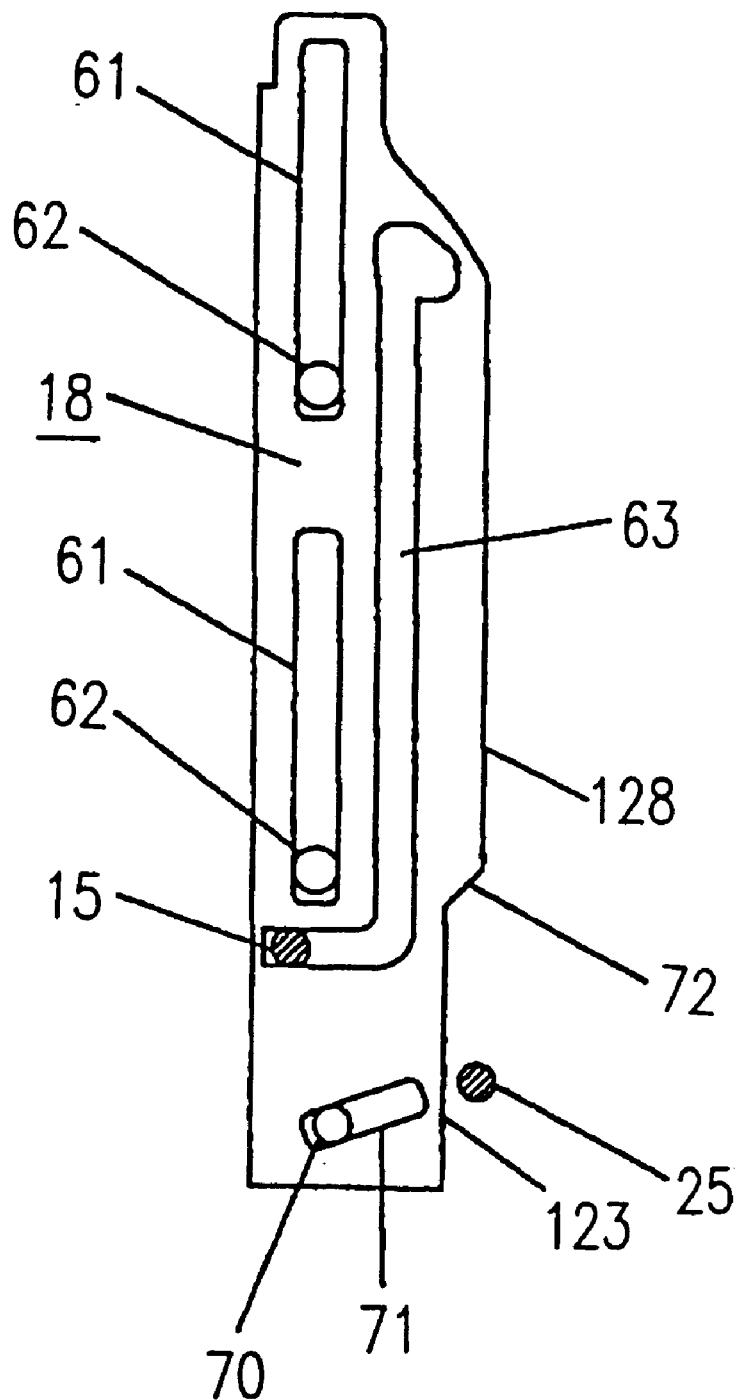
FIG. 4 is a detailed plan view illustrating a tension plate and peripheral elements of the magnetic recording/reproduction apparatus in the unloaded mode.

FIG. 3 is a plan view similar to FIG. 1 illustrating the magnetic recording/reproductlon apparatus in the unloaded mode according to the present embodiment of the invention, but with the subchassis 3 being removed. FIG. 4 illustrates in detail the tension plate 18.

Referring to FIGS. 3 and 4, two elongated holes 61 provided in the tension plate 18 are engaged with two guide pins 62 provided on the main chassis 8, and the tension plate 18 is guided by the guide pins 62 in the forward/backward direction.

A cam groove 63 provided in the tension plate 18 is engaged with the tension arm regulating pin 15 illustrated in FIG. 1. A tension plate drive arm 64 is axially supported about a shaft 65 on the main chassis 8. A cam gear 66 is axially supported about a shaft 67 on the main chassis 8. A cam groove 68 provided on the cam gear 66 is engaged with a cam follower pin 69 provided on the tension plate drive arm 64. A pin 70 provided on the tension plate drive arm 64 is engaged with a cam groove 71 provided in the tension plate 18. The pin 25 provided on the tension band regulating arm 21 in FIG. 1 contacts a right edge cam 72 of the tension plate 18.

Referring to FIGS. 1, 3 and 4, the tension plate drive arm 64 is driven by the cam groove 68 of the cam gear 66, and the tension plate 18 is driven by the pin 70 on the tension plate drive arm 64.

The tension arm 12 and the tension band regulating arm 21 are driven and regulated respectively by the cam groove 63 and the right edge cam 72 provided in the tension plate 18.

Figure 5:
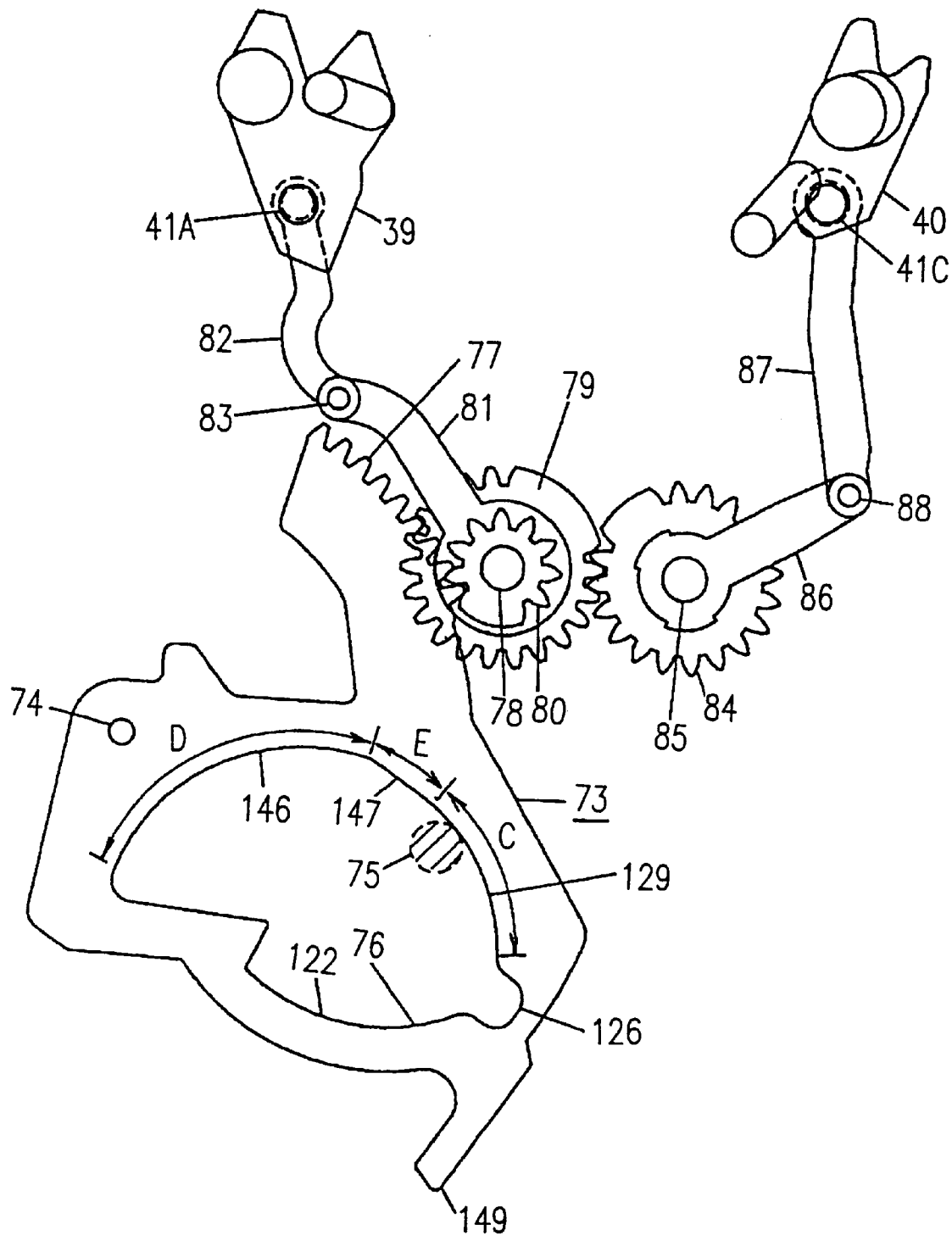
FIG. 5 illustrates a structure for driving an S boat and a T boat provided on a main chassis of the magnetic recording/reproduction apparatus.

FIG. 5 illustrates a structure for driving the S boat 39 and the T boat 40 provided on the main chassis 8.

Referring to FIGS. 3 and 5, a boat drive arm 73 is axially supported about a shaft 74 on the main chassis 8. A drive pin 75 provided on the cam gear 66 contacts an inner cam 76 provided in the boat drive arm 73. The boat drive arm 73 is driven by rotation of the cam gear 66.

A gear portion 77 provided in the boat drive arm 73 is engaged with a small gear portion 80, which is provided integrally with an S load gear 79, which is axially supported about a shaft 78 on the main chassis 8.

An S load arm 81 is supported coaxially with the S load gear 79. An S load link 82 is rotatably attached to the S load arm 81 and the S boat 39 via a shaft 83 and the pin 41A, respectively.

A T load gear 84 is axially supported about a shaft 85 on the main chassis 8, and is engaged with the S load gear 79. A T load arm 86 is supported coaxially with the T load gear 84. A T load link 87 is rotatably attached to the T load arm 86 and the T boat 40 via a shaft 88 and the pin 41C, respectively.

in a normal state, the S load arm 81 and the S load gear 79 are held together by a twisted coil spring (not shown) and rotate about the shaft 78. When the S load gear 79 is rotated in the clockwise direction, the S load gear 79 is biased in the counterclockwise direction by the twisted coil spring (not shown). Similarly, in a normal state, the T load arm 86 and the T load gear 84 are held together by a twisted coil spring (not shown) and rotate about the shaft 85. When the T load gear 84 is rotated in the counterclockwise direction with the T load arm 86 being stopped, the T load gear 84 is biased in the clockwise direction by the twisted coil spring (not shown).

The S load gear 79 and the T load gear 84 are driven by pivotal movement of the boat drive arm 73, thereby moving the S boat 39 and the T boat 40 along the rail 42 via the S load link 82 and the T load link 87, respectively.

Figure 6:
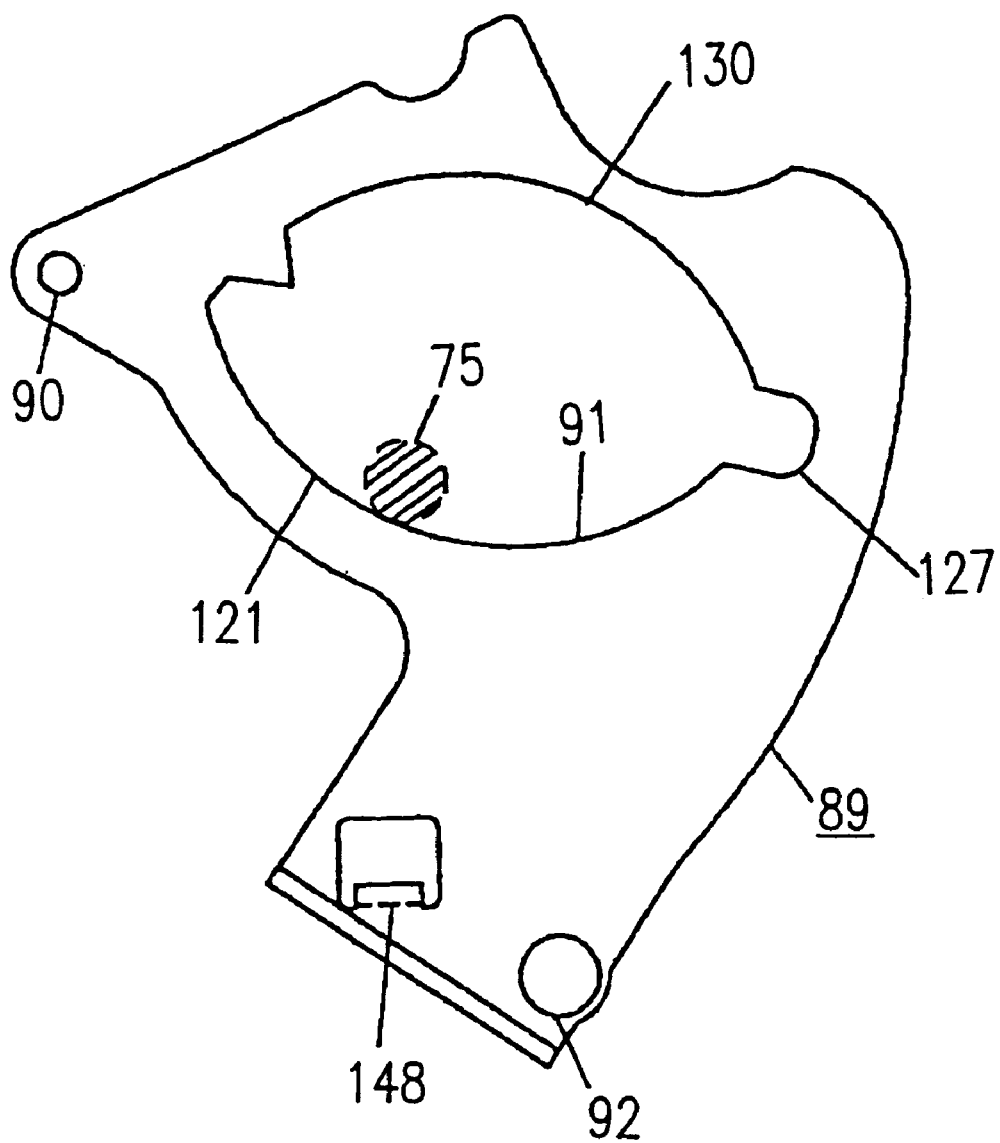
FIG. 6 illustrates a subchassis drive arm of the magnetic recording/reproduction apparatus.

FIG. 6 illustrates a subchassis drive arm 89. Referring to FIGS. 1, 3 and 6, the subchassis drive arm 89 is axially supported about a shaft 90 on the main chassis S. As in the boat drive arm 73, an inner cam 91 provided in the subchassis drive arm 89 is driven by the drive pin 75 provided on the cam gear 66.

A guide pin 92 provided on the subchassis drive arm 89 contacts the cam A plate 32 and the cam B plate 33 via a hole 108 provided in the subchassis 3 as illustrated in FIG. 1. The subchassis drive arm 89 is driven by the cam gear 66, and the subchassis 3 is driven by the subchassis drive arm 89 via the cam A plate 32 and the cam B plate 33.

The position of the subchassis 3 with respect to the main chassis 8 can be adjusted by adjusting the positions of the cam A plate 32 and the cam B plate 33 in the left/right direction.

Referring to FIG. 3, a timing belt 93 transfers the rotation of the capstan 50 to a two-stage gear 94 axially supported on the main chassis 8. The two-stage gear 94 is meshed with the center gear 10, whereby the rotation of the capstan 50 is transferred to the S reel base 4 and the T reel base 5 via the timing belt 93, the two-stage gear 94, the center gear 10 and the idler gear 7.

Figure 7:
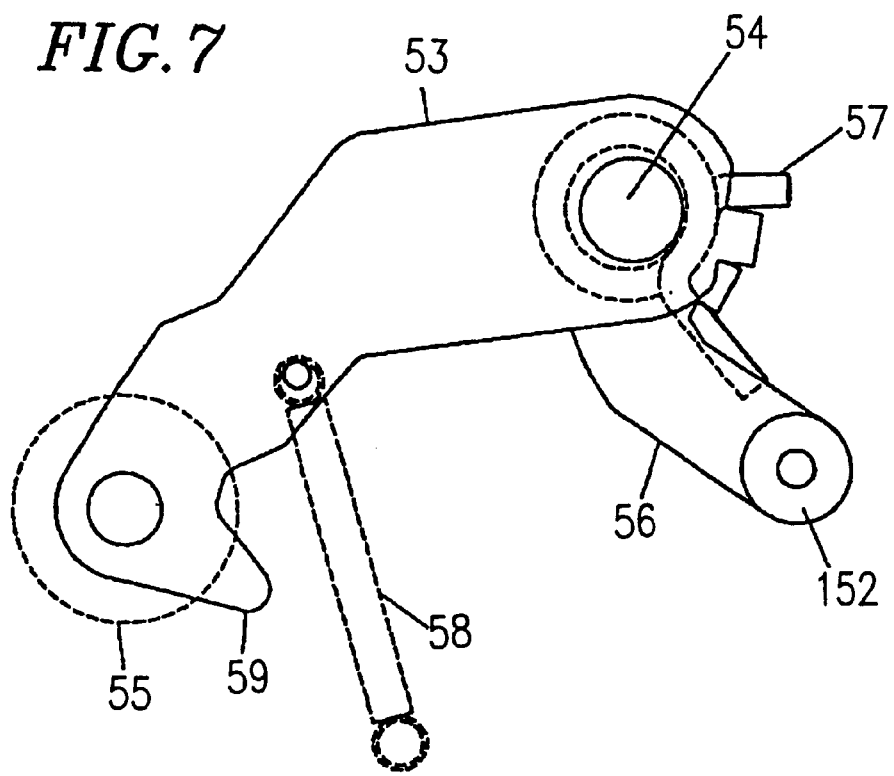
FIG. 7 illustrates a pinch arm and peripheral elements of the magnetic recording/reproduction apparatus.
Figure 8:
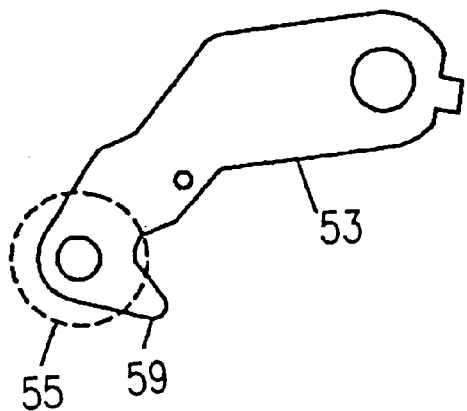
FIG. 8 illustrates the pinch arm of the magnetic recording/reproduction apparatus.
Figure 9:
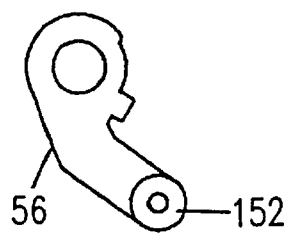
FIG. 9 illustrates a pinch press arm of the magnetic recording/reproduction apparatus.
Figure 10:
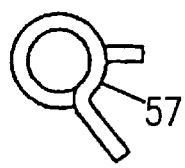
FIG. 10 illustrates a twisted coil spring of the magnetic recording/reproduction apparatus.

FIGS. 7 and 8 illustrate an exemplary structure of the pinch arm 53. FIG. 9 illustrates an exemplary structure of the pinch press arm 56, and FIG. 10 illustrates an exemplary structure of the twisted coil spring 57.

in FIGS. 7 and 8, the pinch roller 55 is illustrated only by its profile in a broken line.

Referring to FIG. 7, in a normal state (e.g., one of various states other than a state where the S boat 39 is in contact with a boat stopper 141), the pinch arm 53 and the pinch press arm 56 are held together by the twisted coil spring 57 and rotate about the pivotal shaft 54. When the pinch press arm 56 is rotated in the clockwise direction while the pinch roller 55 is in contact with the capstan 50 (whereby its pivotal movement is stopped), the pinch roller 55 is pressed against the capstan 50 by virtue of a reacting force from the twisted coil spring 57. A roller 152 is axially supported on the pinch press arm 56.

Referring to FIG. 3, a pinch cam gear 95 is axially supported about a shaft 96 on the main chassis 8. A pinch drive arm 97 is axially supported on the main chassis 8. A cam pin 99 provided on the pinch drive arm 97 is engaged with a cam groove 100 provided in the pinch cam gear 95, whereby the pinch drive arm 97 is driven by the pinch cam gear 95.

Referring to FIGS. 1 and 3, the T4 arm regulating pin 31 passes through a hole 101 provided in the subchassis 3 so as to contact a protrusion 102 provided on the pinch drive arm 97. The T4 arm 28 is driven by the rotation of the pinch drive arm 97.

Figure 11:
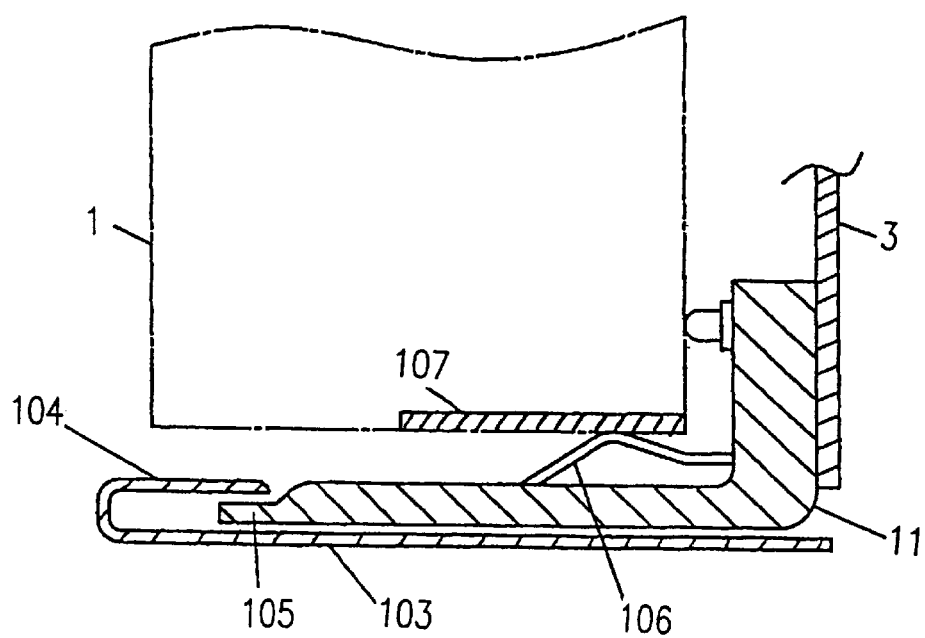
FIG. 11 is a cross-sectional view of an MIC-SW of the magnetic recording/reproduction apparatus taken along A—A line in FIG. 1.

FIG. 11 is a cross-sectional view taken along a chain line A—A in FIG. 1, illustrating the MIC-SW 11.

Referring to FIGS. 1 and 11, the MIC-SW 11 is fixed by a screw (not shown) on the subchassis 3. A subchassis reinforcing plate 103 is fixed on the subchassis 3 by means of a screw (not shown). A folded upper end portion 104 of the subchassis reinforcing plate 103, shown on the left side of FIG. 11, is engaged with an upper end portion 105 of the MIC-SW 11, thereby increasing the mechanical strength of the MIC-SW 11.

A contact terminal 106 provided on the MIC-SW 11 contacts a memory-in-cassette 107 provided in the cassette so as to input/output a signal. As the contact terminal 106 is pressed by the cassette 1. the MIC-SW 11 is subject to the reacting force. The main body of the MIC-SW 11 is typically made of a plastic, or the like, and therefore the MIC-SW 11 is subject to creep deformation. According to the present invention, however, the MIC-SW 11 can be reinforced by the subchassis reinforcing plate 103, whereby the MIC-SW 11 can be made thin, thereby reducing the size of the apparatus.

Figure 12:
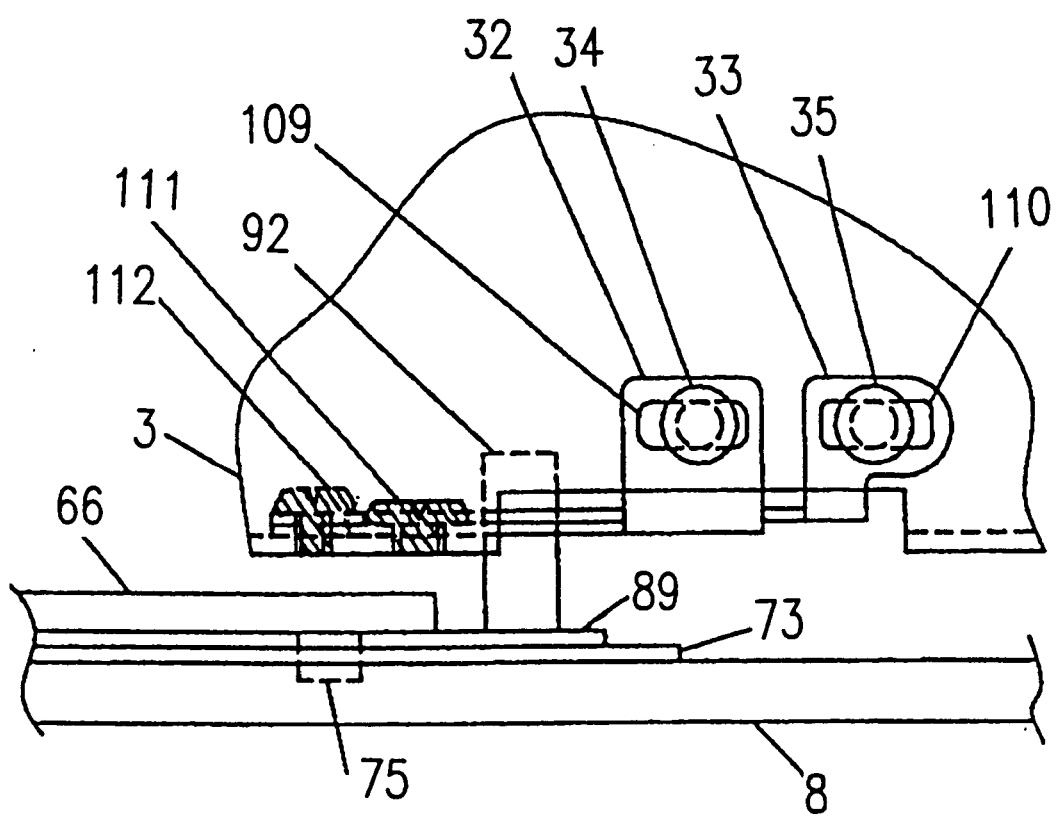
FIG. 12 is a cross-sectional view of the magnetic recording/reproductlon apparatus taken along the direction indicated by an arrow B in FIG. 1.

FIG. 12 illustrates the magnetic recording/reproduction apparatus of FIG. 1 as viewed from the direction B.

Referring to FIGS. 1 and 12, the boat drive arm 73 and the subchassis drive arm 89 are driven by the drive pin 75 provided on the cam gear 66. Elongated holes 109 and 110 are provided in the cam A plate 32 and the cam B plate 33, respectively.

The cam A plate 32 and the cam B plate 33 are held on the subchassis 3 so as to be movable in the left/right direction via the elongated holes 109 and 110. The cam A plate 32 and the cam B plate 33 are fixed to the subchassis 3 by screws 111 and 112.

in positions 113 and 114 in FIG. 1, the positions of the cam A plate 32 and the cam B plate 33 are adjusted so as to guide the guide pin 92 in the left/right direction with respect to the subchassis 3, after which the cam A plate 32 and the cam B plate 33 are fixed by means of the screws 111 and 112.

FIGS. 13 to 17 are plan views illustrating a sequence of operation modes from the unloaded mode to the tape recording/reproduction mode according to the present embodiment of the invention.

Figure 13:
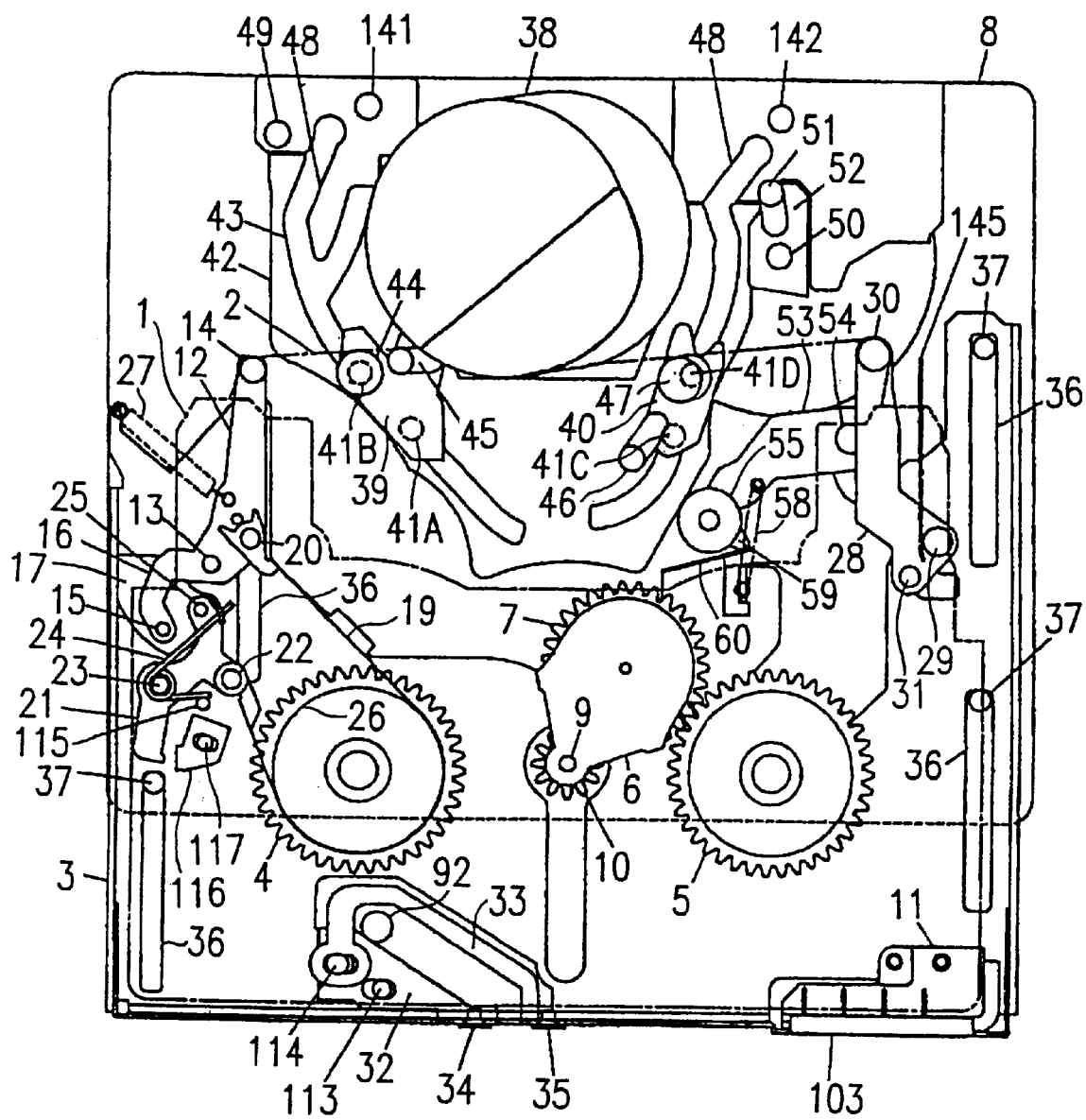
FIG. 13 is a plan view of the magnetic recording/reproduction apparatus in a loaded mode 1 where a tension post and a T4 post are pulled out.
Figure 14:
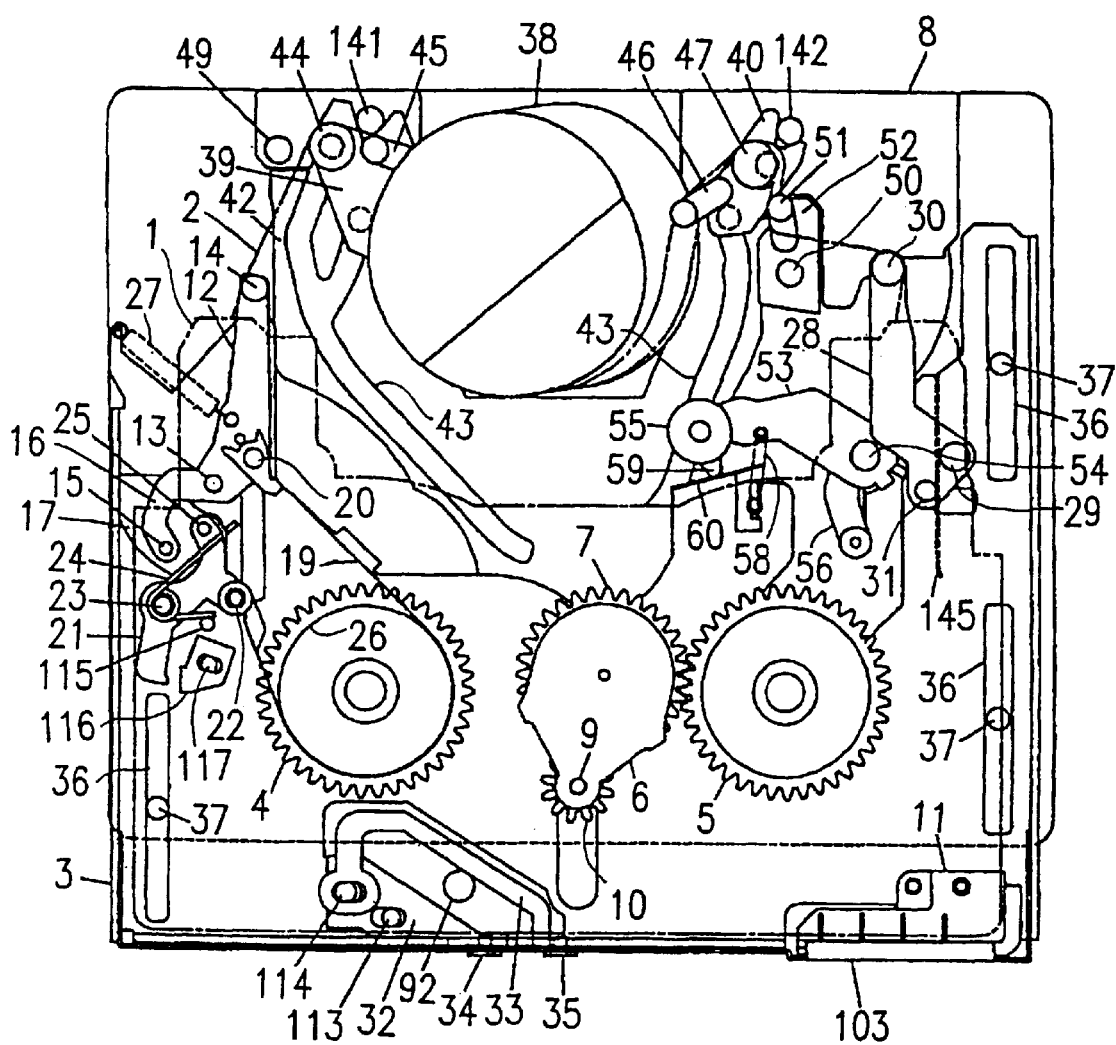
FIG. 14 is a plan view of the magnetic recording/reproduction apparatus in a loaded mode 2 where the subchassis has moved one half of its total stroke.
Figure 15:
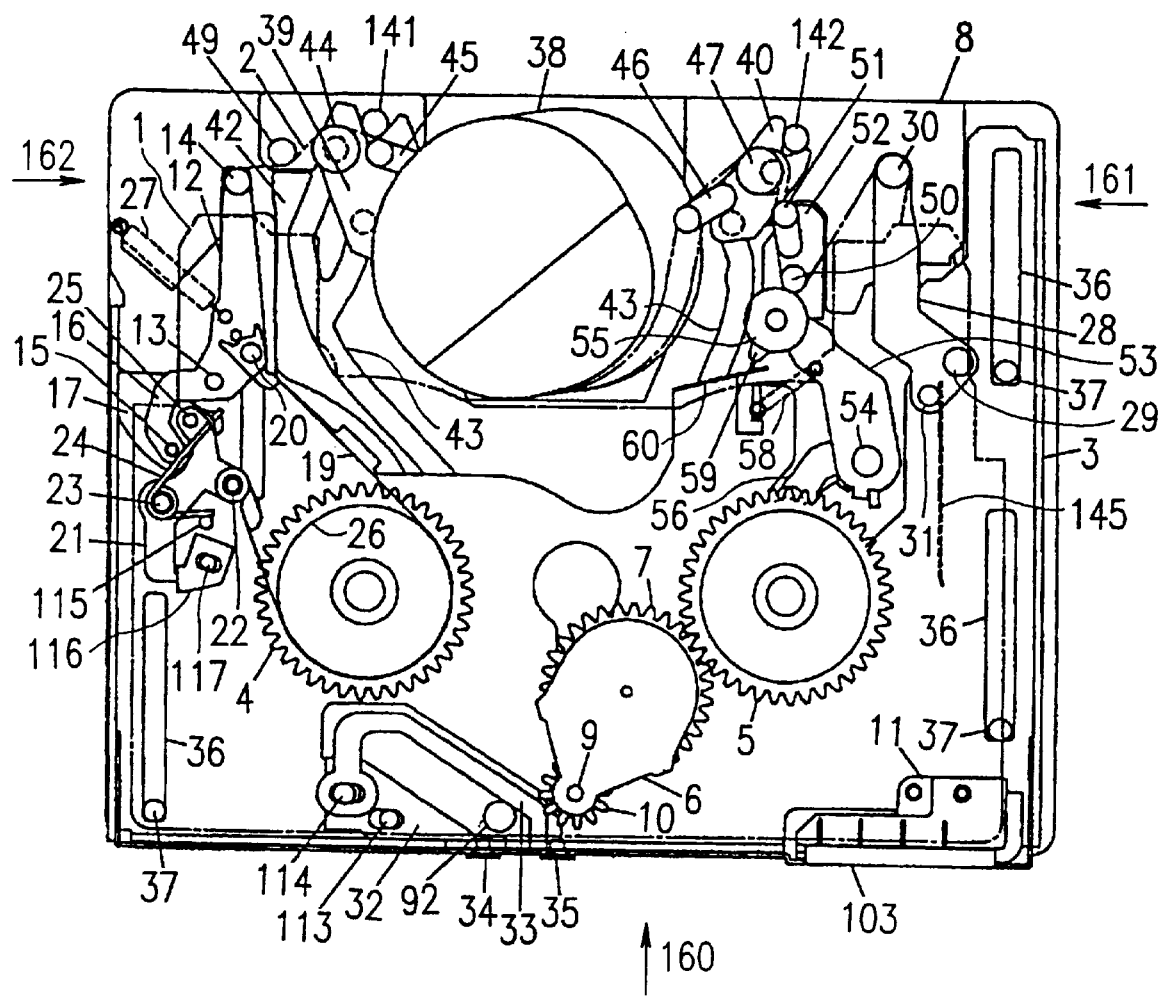
FIG. 15 is a plan view of the magnetic recording/reproduction apparatus in a play mode where the apparatus is ready to perform functions such as recording, reproduction and fast-forward of a tape.

FIG. 13 illustrates a mode where the tension post 14 and the T4 post 30 have been pulled out (hereinafter, referred to as the "loaded mode 1"). FIG. 14 illustrates a mode where the subchassis 3 has moved one half of its total stroke (hereinafter, referred to as the "loaded mode 2"). FIG. 15 illustrates a mode where the subchassis 3 has moved completely while the tape loading (i.e., winding of the tape 2 around the cylinder 38) has been complete (hereinafter, referred to as the "play mode"). In the play mode, the tape can be driven in the forward direction (from the S reel base 4 to the T reel base 5), thereby performing functions such as recording, reproduction and fast-forward of the tape.

Figure 16:
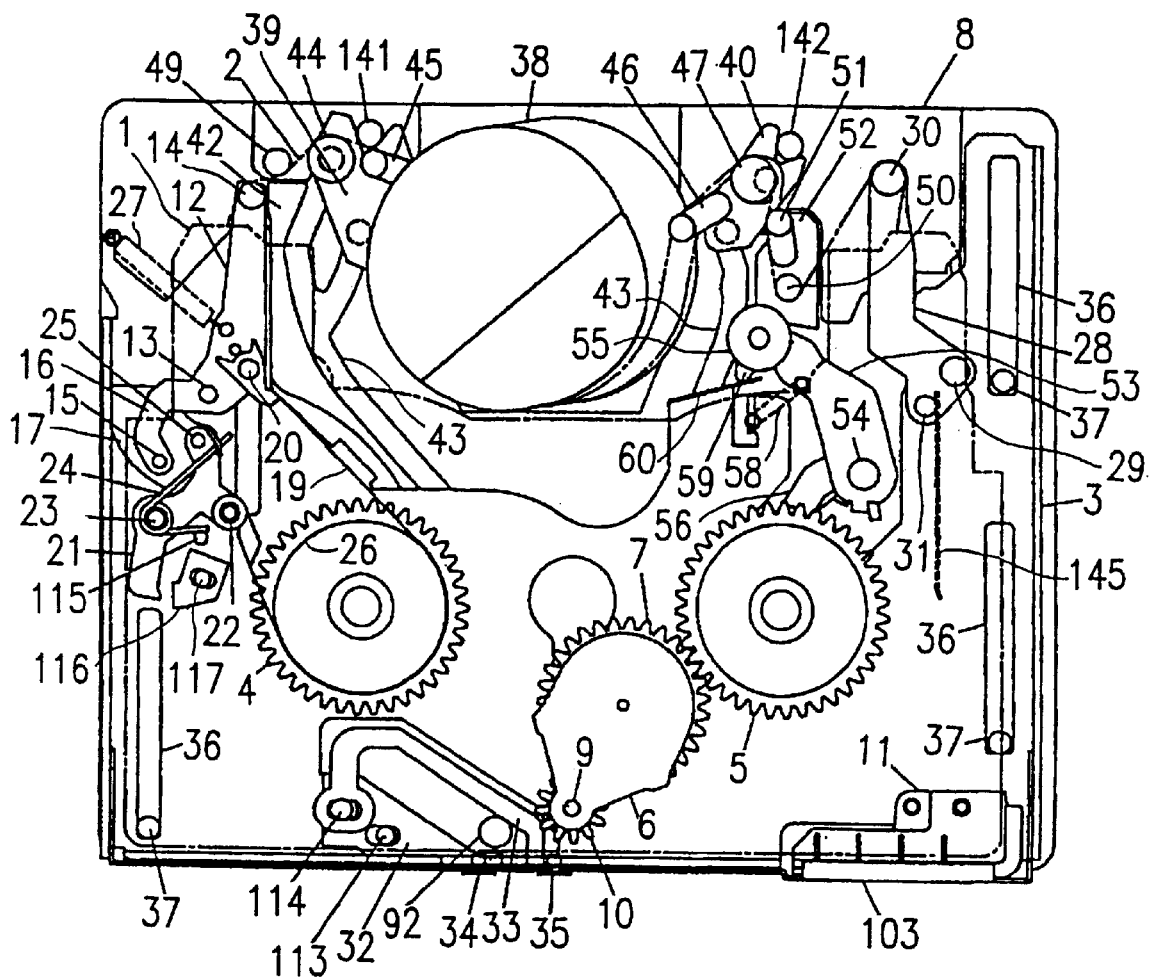
FIG. 16 is a plan view illustrating the magnetic recording/reproduction apparatus in a stop mode where the tape is not being driven.

FIG. 16 illustrates a mode where the tape is not driven (hereinafter, referred to as the "stop mode").

Figure 17:
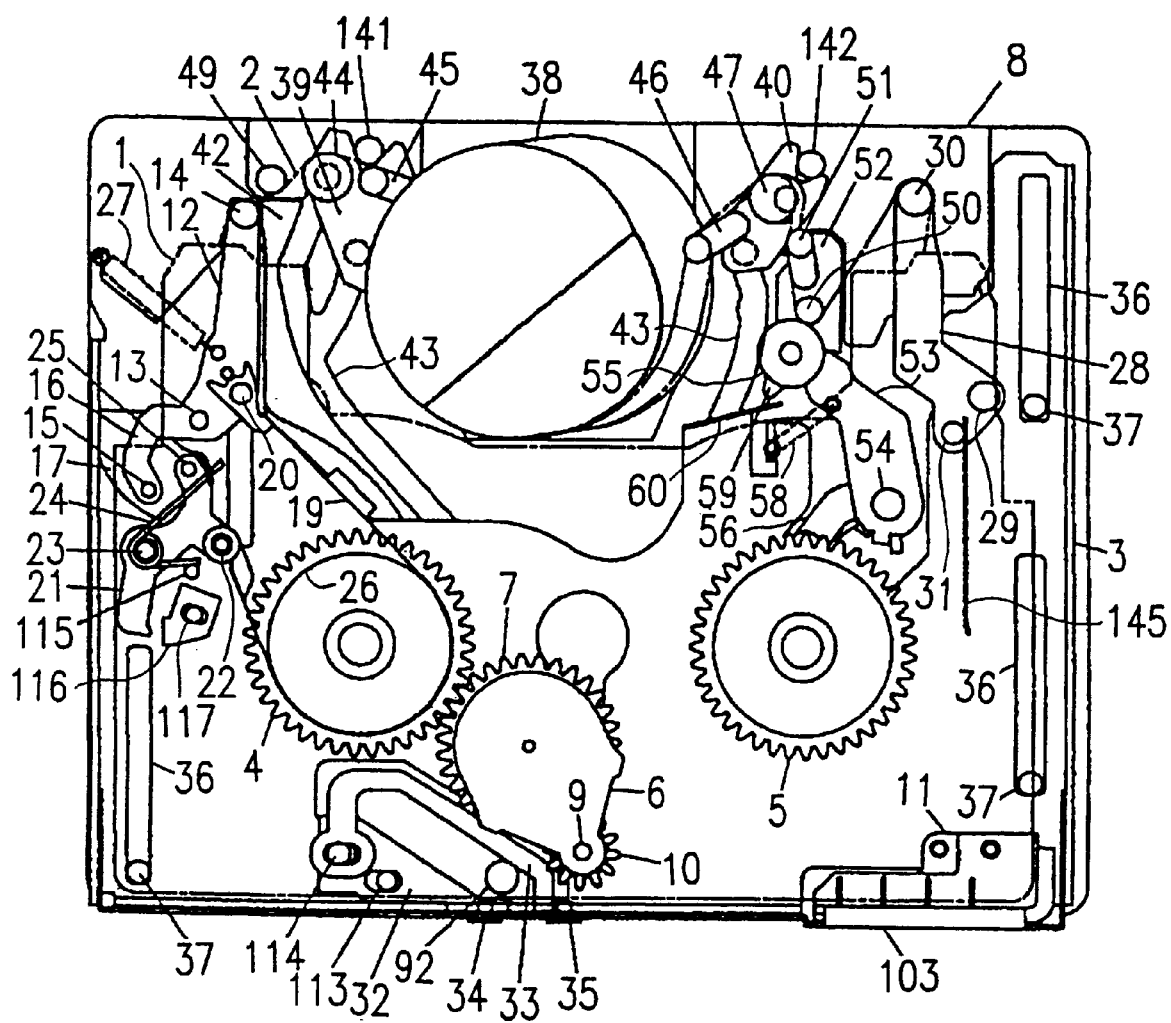
FIG. 17 is a plan view illustrating the magnetic recording/reproduction apparatus in a reverse mode where the apparatus is ready to perform functions such as reverse reproduction and rewinding of the tape.

FIG. 17 illustrates a mode where the tape can be driven in the reverse direction (from the T reel base 5 to the S reel base 4), thereby performing other functions such as reverse reproduction and rewinding of the tape (hereinafter, referred to as the "reverse mode").

Elements in FIGS. 13 to 17 having like reference numerals to those shown in FIG. 1 will not be further described.

An exemplary structure of the main chassis 8 will now be described with reference to FIGS. 18 and 19.

Figure 18:
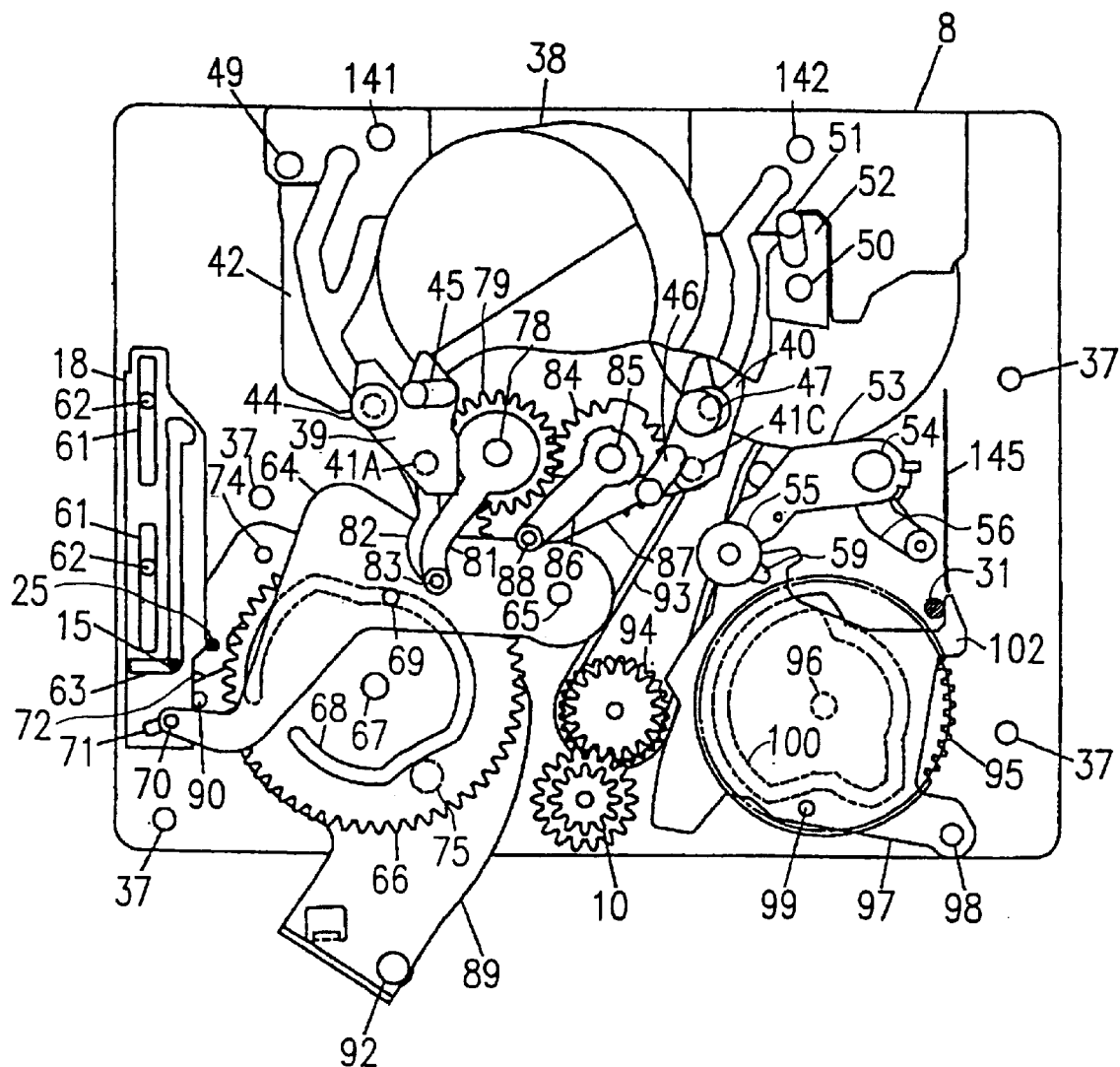
FIG. 18 is a plan view illustrating the magnetic recording/reproduction apparatus in the loaded mode 1 with the subchassis being removed.
Figure 19:
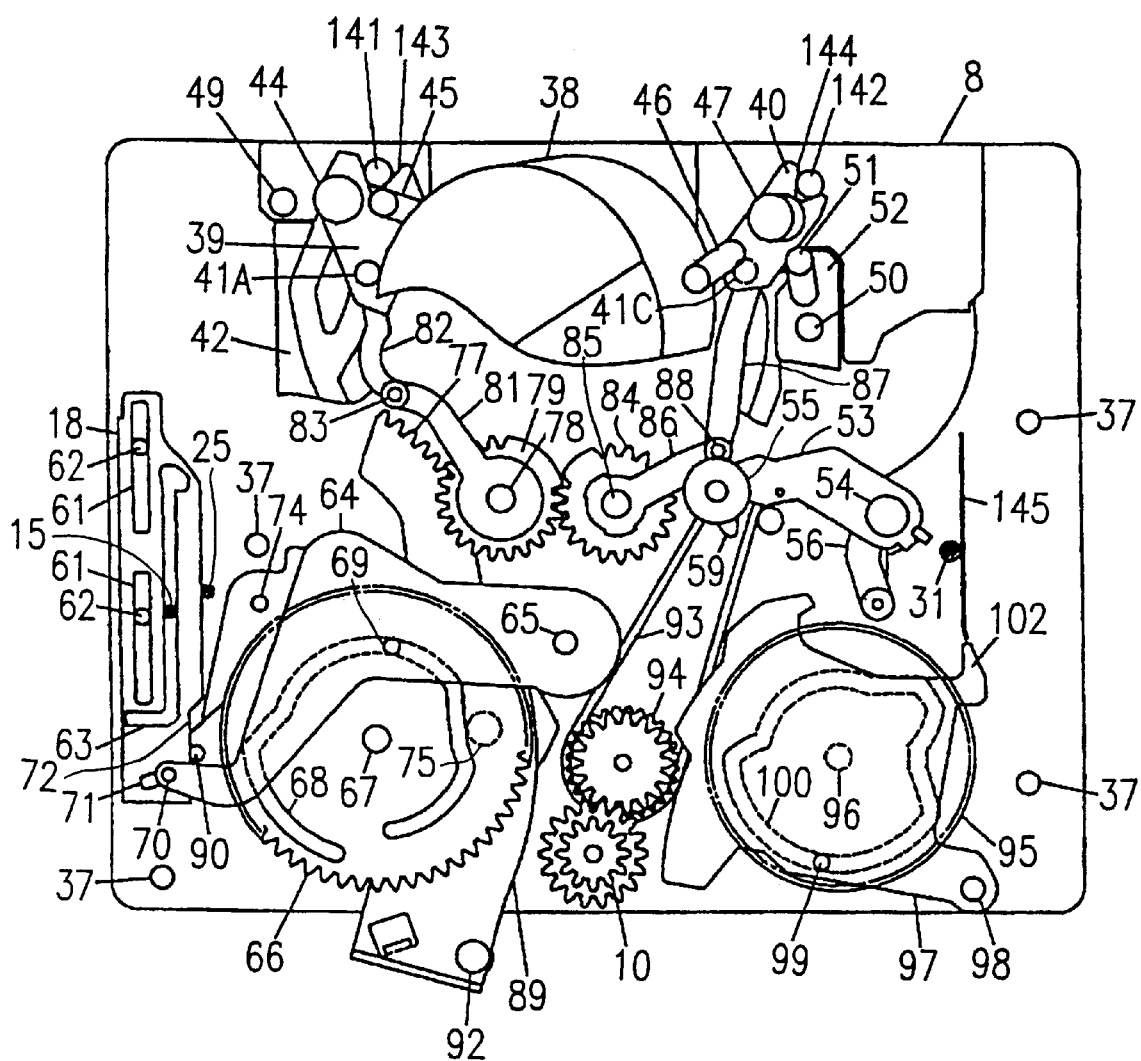
FIG. 19 is a plan view illustrating the magnetic recording/reproduction apparatus in the loaded mode 2 with the subchassis being removed.

FIGS. 18 and 19 are plan views similar to FIG. 3 illustrating an embodiment of the present invention, but with the subchassis 3 being removed.

FIG. 18 illustrates the magnetic recording/reproduction apparatus in the loaded mode 1, and FIG. 19 illustrates the magnetic recording/reproduction apparatus in the loaded mode 2. As described above, the unloaded mode is illustrated in FIG. 3. Elements in FIGS. 18 and 19 having like reference numerals to those shown in FIG. 3 will not be further described.

Figure 22:
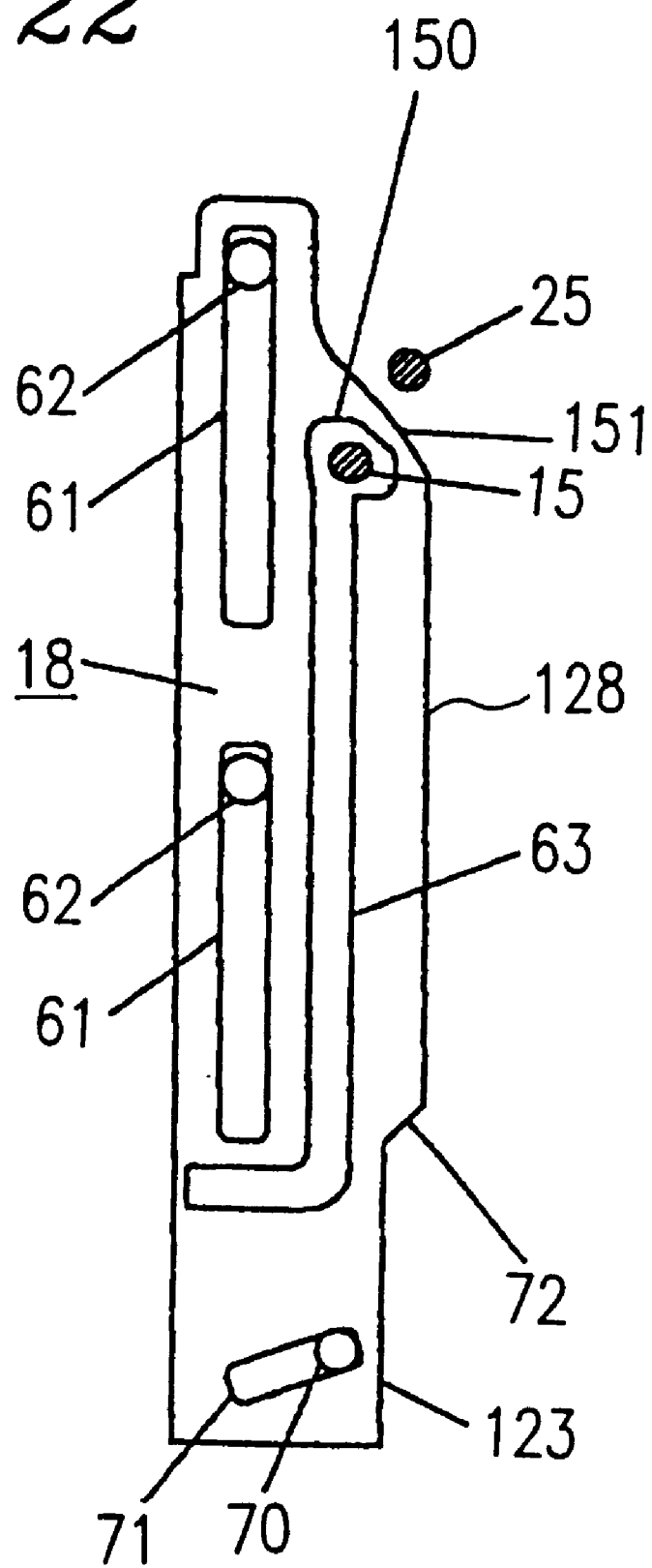
FIG. 22 is a plan view illustrating the tension plate and the peripheral elements of the magnetic recording/reproduction apparatus in the play mode.
Figure 23:
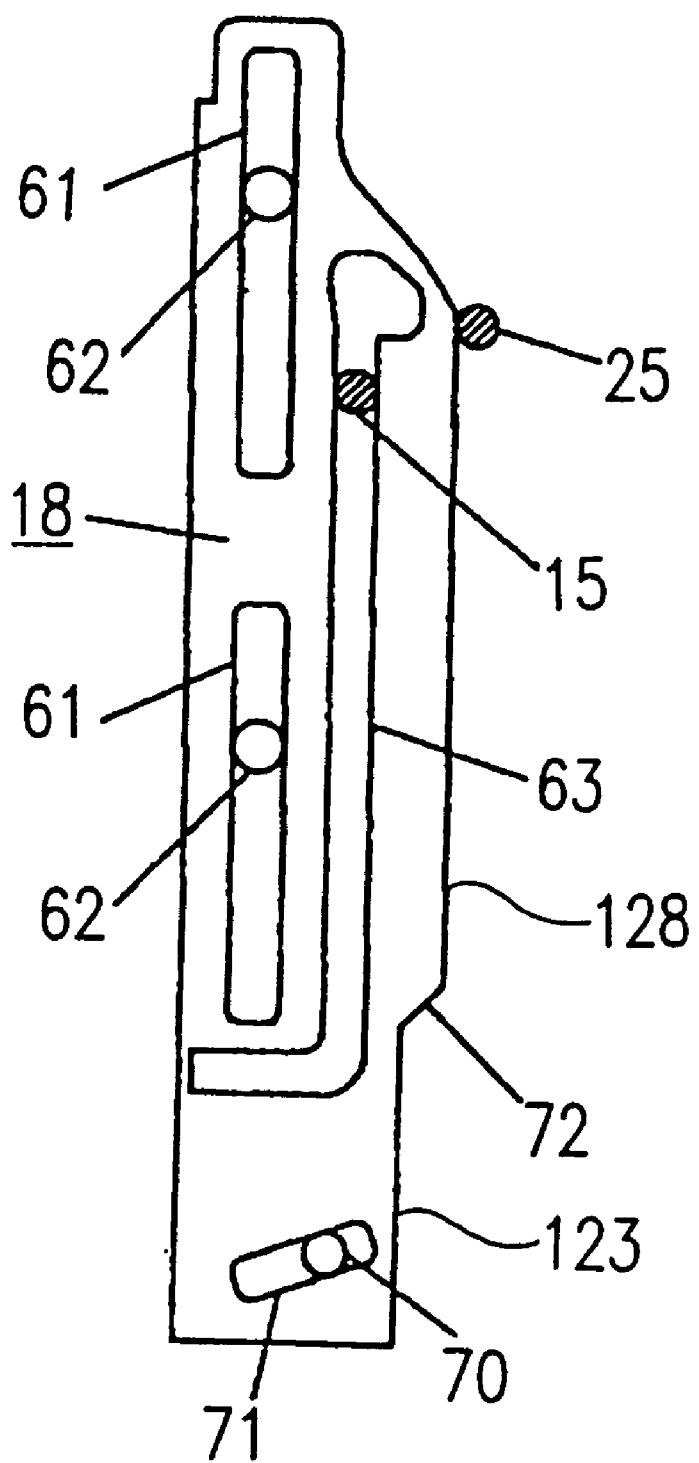
FIG. 23 is a plan view illustrating the tension plate and the peripheral elements of the magnetic recording/reproduction apparatus in the stop or reverse mode.

FIGS. 20 to 23 are detailed views illustrating the tension plate 18 and the peripheral elements. In particular, FIGS. 20 to 23 illustrate the positional relationship among the tension plate 18, the tension arm regulating pin 15, the pin 25 and the guide pins 62, in the loaded mode 1, the loaded mode 2, the play mode, and the stop or reverse mode, respectively. Note that, in the present embodiment of the invention, the positional relationship among these elements is the same in the stop mode and in the reverse mode, as illustrated in FIG. 23.

As described above, the positional relationship among these elements in the unloaded mode is illustrated in FIG. 4. Elements in FIGS. 20 to 23 having like reference numerals to those shown in FIG. 4 will not be further described.

FIGS. 24 to 30 illustrate an operation where the boat drive arm 73 and the subchassis drive arm 89 are driven by the drive pin 75 provided in the cam gear 66 (shown in FIG. 3). FIGS. 24 to 30 correspond to the unloaded mode, the loaded mode 1, the loaded mode 2, a "pre-play mode", the play mode, the stop mode, the reverse mode, respectively. Herein, the "pre-play mode" is between the loaded mode 2 and the play mode and is close to the loaded mode 2.

Figure 32:
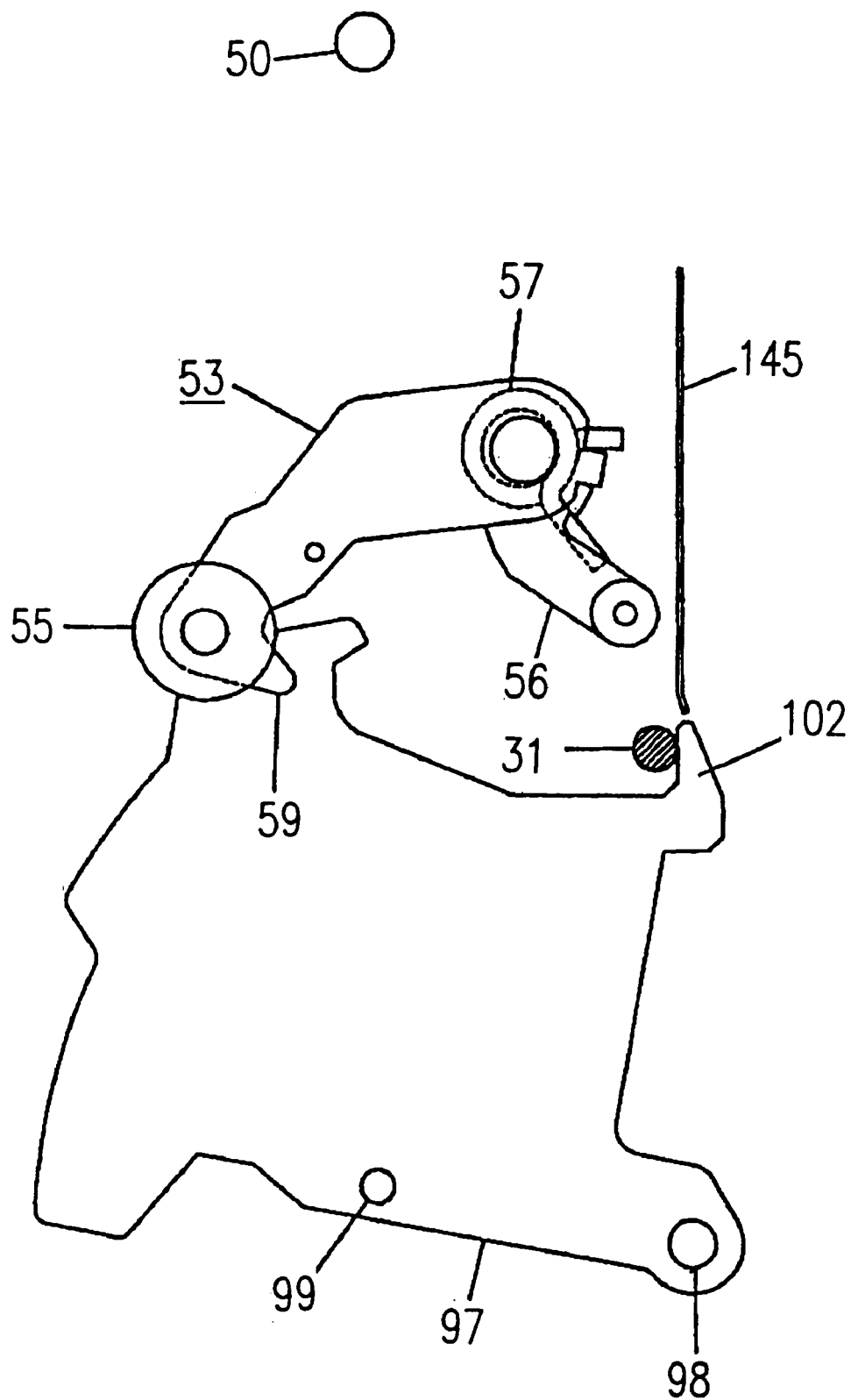
FIG. 32 is a plan view illustrating the relative positions of the pinch arm and the T4 arm of the magnetic recording/reproductlon apparatus in the loaded mode 1.
Figure 33:
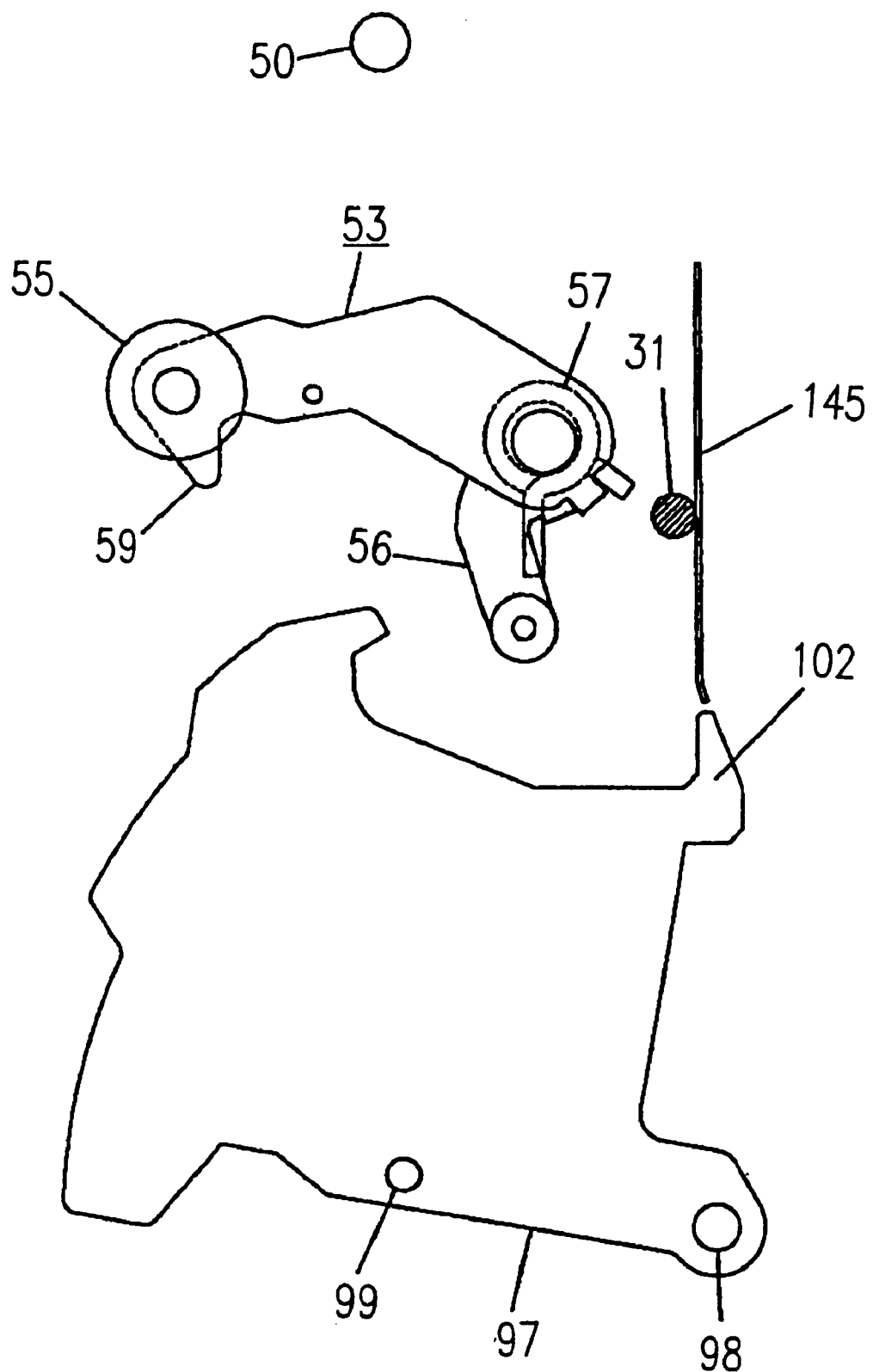
FIG. 33 is a plan view illustrating the relative positions of the pinch arm and the T4 arm of the magnetic recording/reproduction apparatus in the loaded mode 2.
Figure 34:
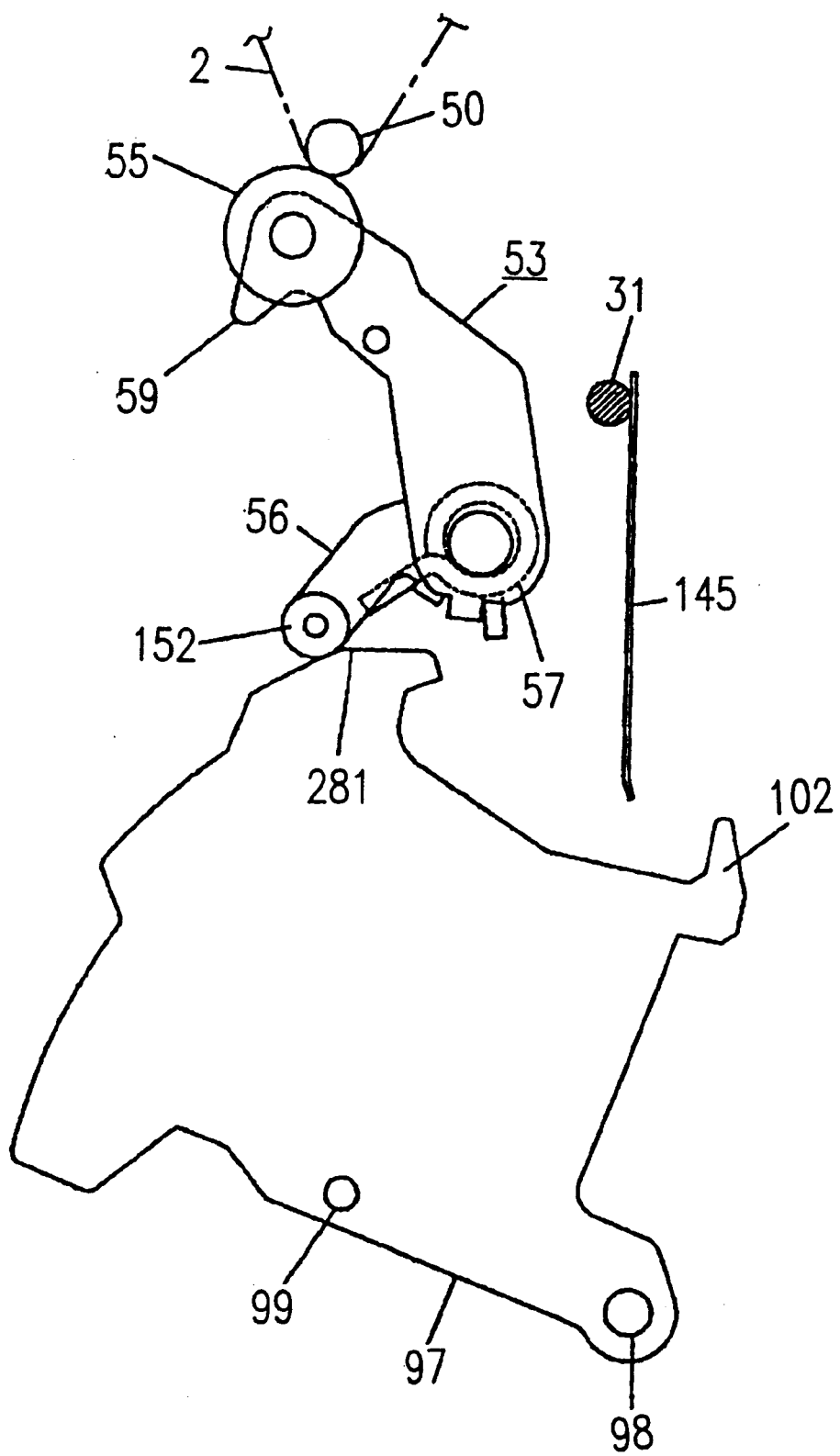
FIG. 34 is a plan view illustrating the relative positions of the pinch arm and the T4 arm of the magnetic recording/reproduction apparatus in the play or reverse mode.

FIGS. 31 to 35 illustrate an operation where the pinch arm 53 on the main chassis 8 and the T4 arm 28 on the subchassis 3 are driven by the pinch drive arm 97. In FIGS. 31 to 35, the T4 arm 28 itself is not shown, but only the T4 arm regulating pin 31 provided thereon is shown. FIGS. 31 to 35 correspond to the unloaded mode, the loaded mode 1, the loaded mode 2, the play and reverse modes, and the stop mode, respectively. Note that, in the present embodiment of the invention, the respective movements of the pinch drive arm 97, the pinch arm 53 and the T4 arm 28 are the same in the play mode and in the reverse mode, as illustrated in FIG. 34.

Figure 24:
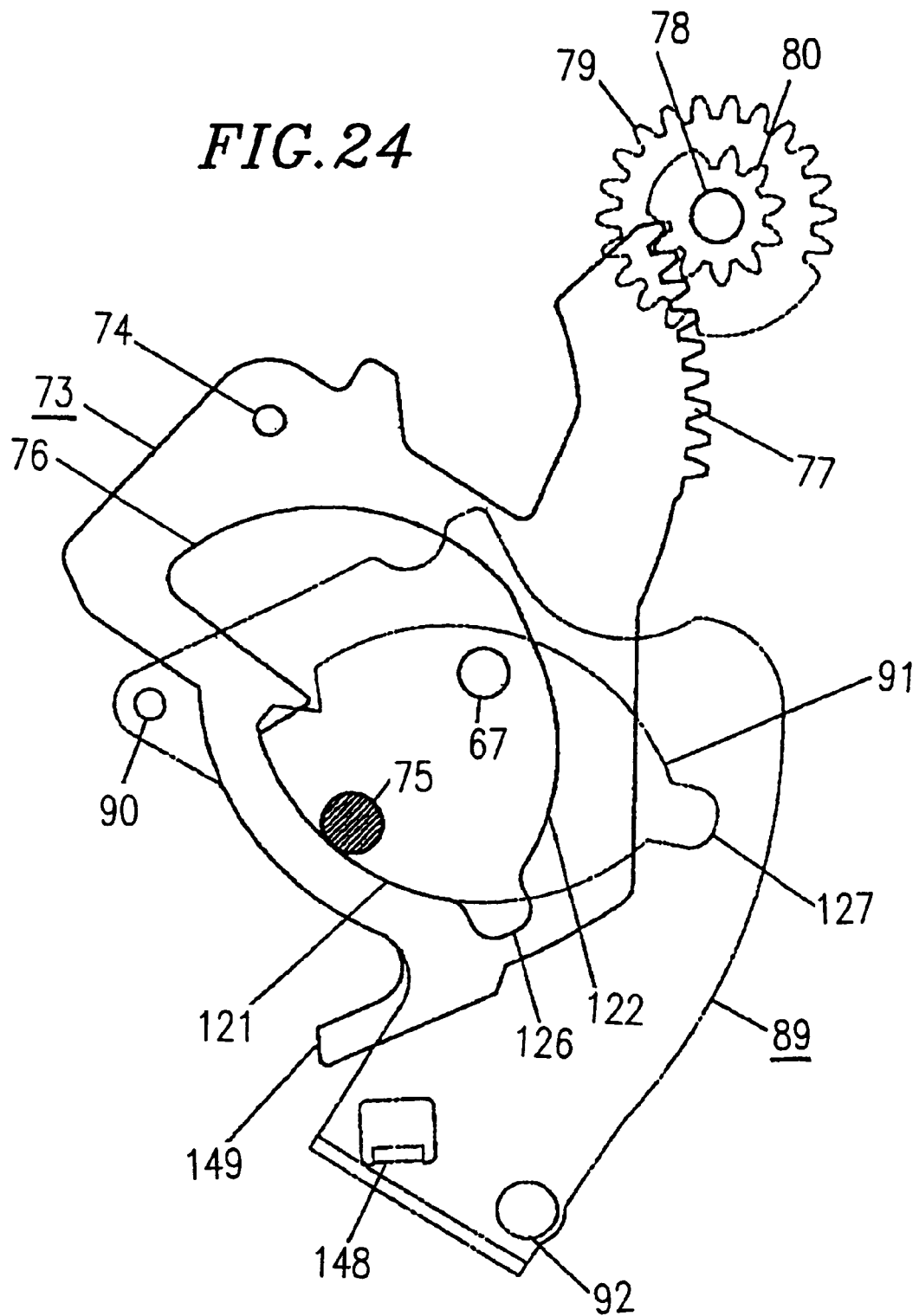
FIG. 24 is a plan view illustrating the relative positions of a boat drive arm and a subchassis drive arm of the magnetic recording/reproduction apparatus in the unloaded mode.

An operation for transiting from the unloaded mode to the reverse mode according to the present embodiment of the invention will be described. As described above, FIGS. 1, 3, 4, 24 and 31 relate to the unloaded mode.

in FIG. 1, the tape 2 has not been pulled out from the cassette 1.

in FIGS. 1, 3 and 24, the subchassis 3 is in the farthest position from the main chassis 8. The drive pin 75 on the cam gear 66 is in contact with respective first arc portions 121 and 122 of the inner cams 91 and 76 provided in the subchassis drive arm 89 and the boat drive arm 73. The subchassis drive arm 89 and the boat drive arm 73 are in their farthest rotational positions in the clockwise direction.

The S load gear 79 is in the state of having been rotated counterclockwise to the maximum by the gear portion 77 of the boat driving arm 73. This state of the S load gear 79 forces the S boat 39 to be located at the most forward position in the elongated hole 43 of the rail 42 as is understood from the construction shown in FIG. 5. Likewise, the T load gear 84 is in the state of having been rotated clockwise to the maximum. This state of the T load gear 84 forces the T boat 40 to be located at the most forward position in the elongated hole 43 of the rail 42 as is understood from the construction shown in FIG. 5.

in FIGS. 1, 3 and 4, the tension plate 18 is in its rearmost position (the lower most position in the Figures) corresponding to the position of the tension plate drive arm 64, and the tension arm 12 is in the farthest rotational position in the clockwise direction corresponding to the position of the tension arm regulating pin 15 along the cam groove 63 in the tension plate 18.

The pin 25 provided in the tension band regulating arm 21 is located along a lower depression 123 of the right edge cam 72 of the tension plate 18, where the tension band regulating arm 21 is stopped by the tension arm stop plate 116.

The tension band regulating arm 21 is biased in the counterclockwise direction by the twisted coil spring 24 into contact with, and stopped by, the tension arm stop plate 116.

In this position, the end 124 of the tension band 19 is close to the S reel base 4, whereby the tension band 19 is slack, but the other end 125 of the tension band 19 is moved by the tension band regulating arm z1 away from the S reel base 4, thereby reducing the slack of the tension band 19.

Figure 31:
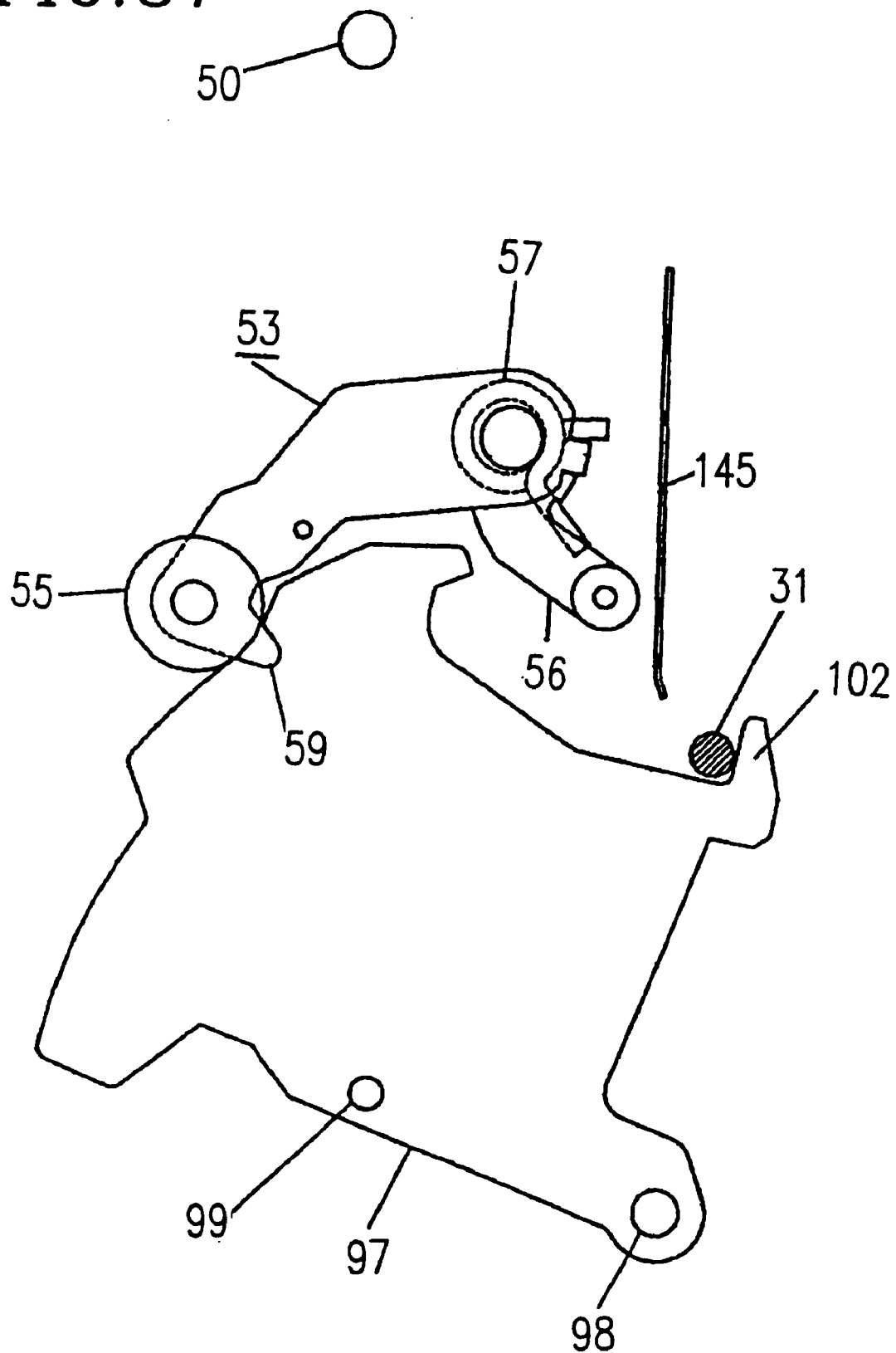
FIG. 31 is a plan view illustrating the relative positions of the pinch arm and the T4 arm of the magnetic recording/reproduction apparatus in the unloaded mode.

Moreover, the protrusion A 118 of the tension band 19 is pushed by the band regulating protrusion 120 provided in the tension arm 12, thereby also reducing the slack of the tension band 19. These together prevent the tension band 19 from slacking and thus dropping off the S reel base 4.

in FIGS. 1, 3 and 31, the pinch arm 53 has been pivoted to its farthest pivotal position in the counterclockwise direction by the tension spring 58. In this position, the pinch drive arm 97 is not in contact with the pinch arm 53.

The T4 arm 28 is in its farthest pivotal position in the counterclockwise direction.

The loaded mode 1 will now be described with reference to FIGS. 13, 18, 20, 25 and 32.

Figure 20:
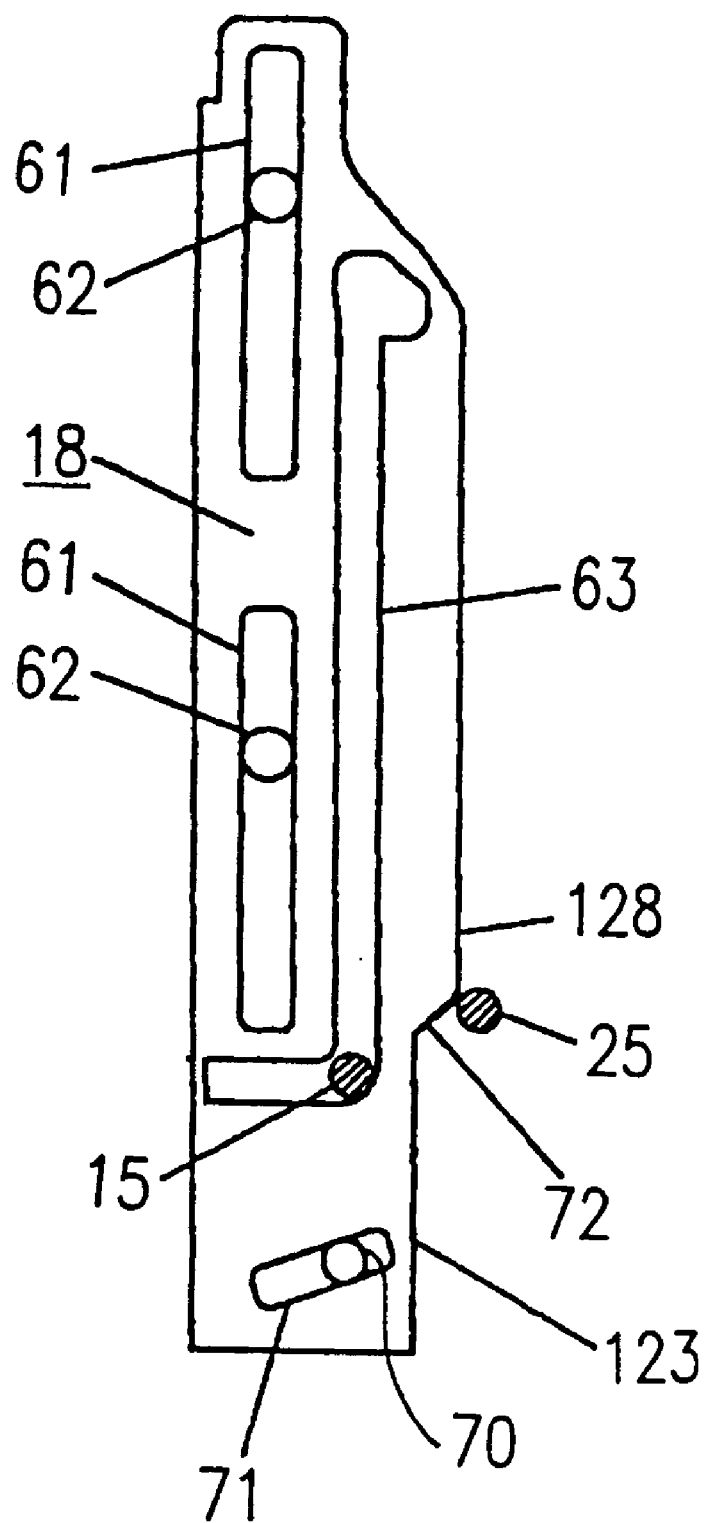
FIG. 20 is a plan view illustrating the tension plate and the peripheral elements of the magnetic recording/reproduction apparatus in the loaded mode 1.
Figure 21:
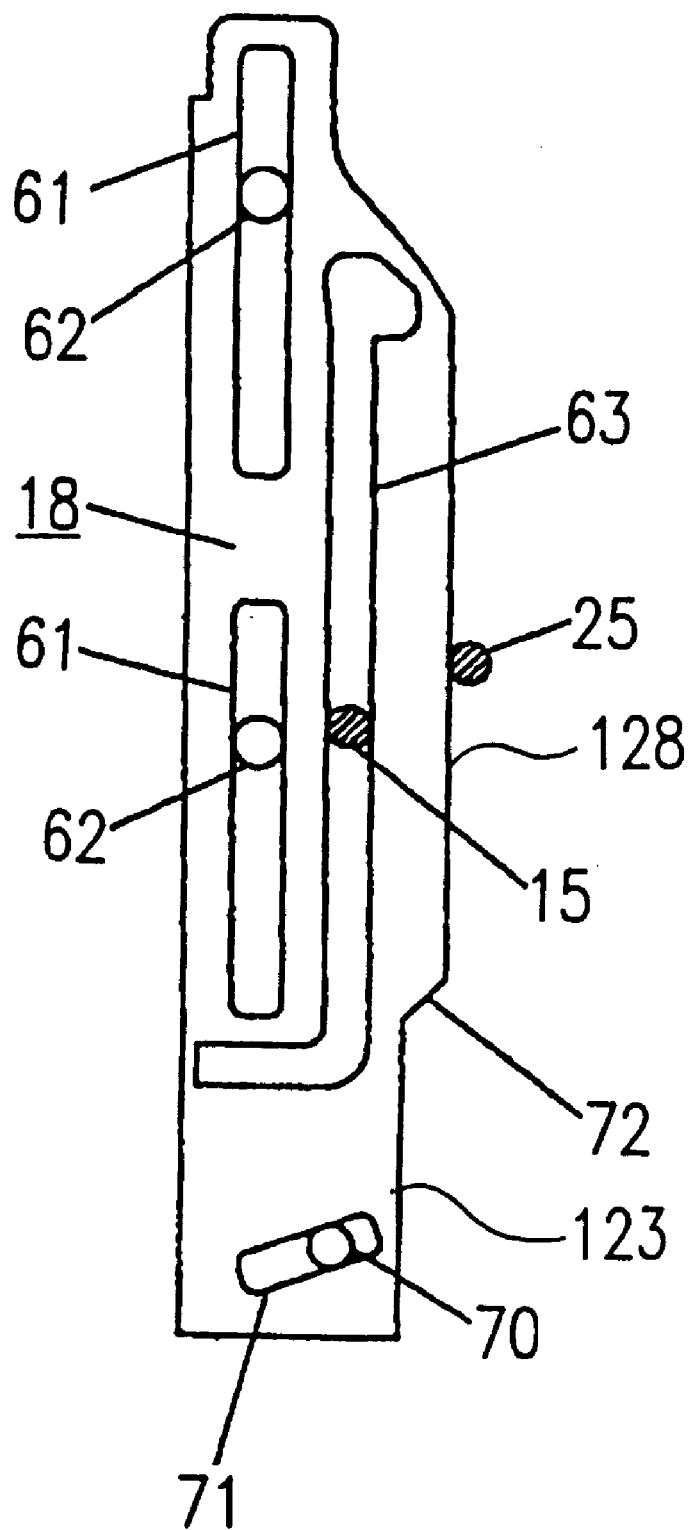
FIG. 21 is a plan view illustrating the tension plate and the peripheral elements of the magnetic recording/reproduction apparatus in the loaded mode 2.
Figure 25:
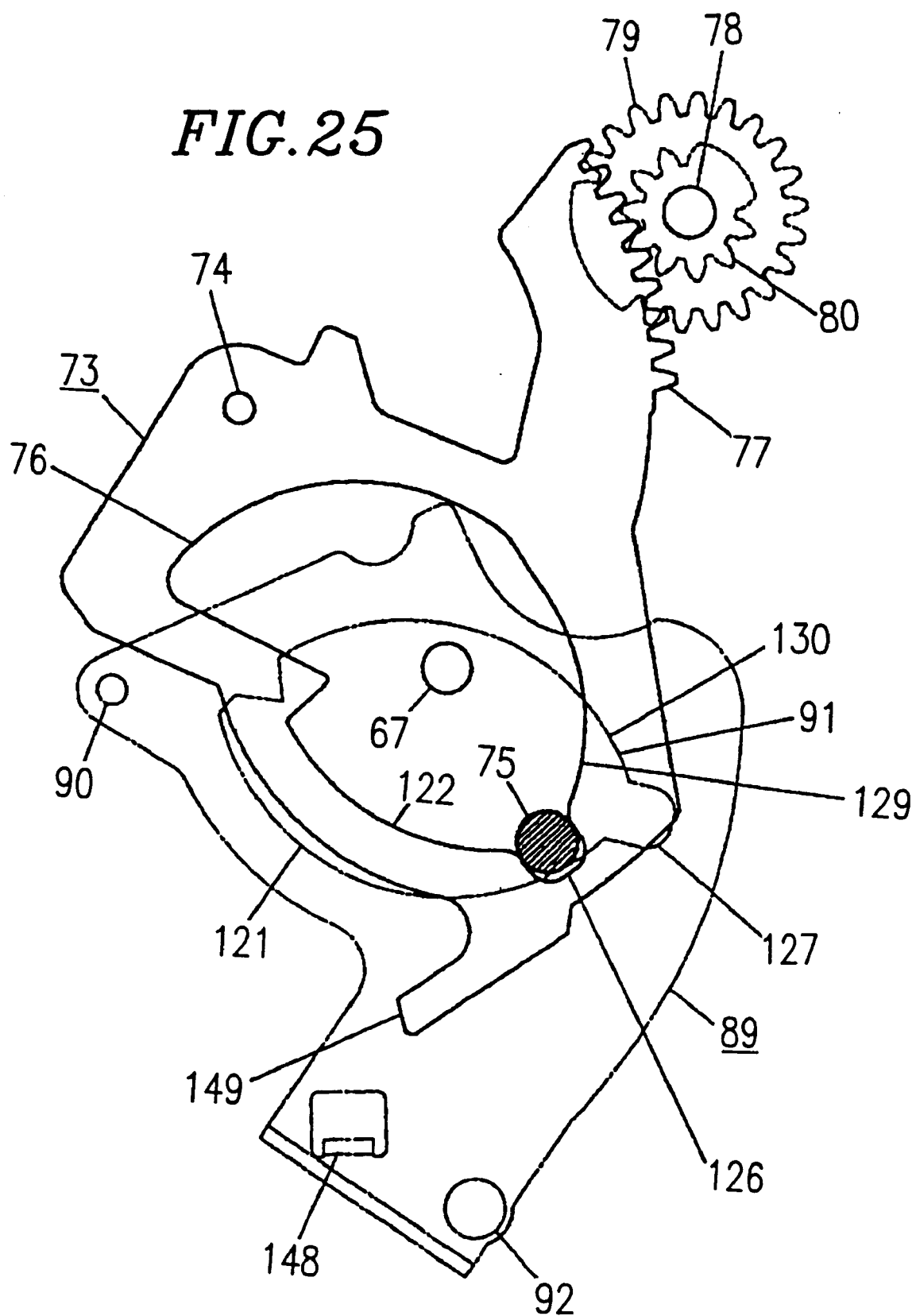
FIG. 25 is a plan view illustrating the relative positions of the boat drive arm and the subchassis drive arm of the magnetic recording/reproduction apparatus in the loaded mode 1.

Referring to FIG. 13, the tape 2 has been pulled out by the tension post 14 and the T4 post 30 to the position illustrated in FIG. 13. The tape 2 has been partially wound around the Si post 45 on the S boat 39 and the cylinder 38.

in FIGS. 13, 18 and 25, the drive pin 75 on the cam gear 66 is still on the first arc portion 121 of the subchassis drive arm 89, and the subchassis 3 has not been driven and is in its unloaded mode position. In the boat drive arm 73, on the other hand, the drive pin 75 has passed the first arc portion 122 and is engaged with a depression 126 provided in the inner cam 76, and the boat drive arm 73 has started rotating in the counterclockwise direction, with the S boat 39 and the T boat 40 being moved along the rail 42 in the direction to pull out the tape 2 by the S load gear 79 and the T load gear 84, respectively.

in FIGS. 13, 18 and 20, the tension plate 15 is moved by the tension plate drive arm 64 to the forward side (the cylinder side), along with which the tension arm regulating pin 15 is driven by the cam groove 63 of the tension plate 18 so as to rotate the tension arm 12 in the counterclockwise direction, thereby pulling out the tape 2. Along with the movement of the tension plate 18, the tension band regulating arm 21 is rotated by a protrusion 128 of the right edge cam 72 in the clockwise direction. Therefore, the tension band 19 slackens for the cylindrical portion 26 of the S reel base 4 so that the S reel base 4 is allowed to rotate.

in FIGS. 13, 18 and 32, the subchassis 3 has not been moved, whereby the pinch arm 53 is in its position as in the unloaded mode.

The T4 arm 28 is moved to pull out the tape 2 by the protrusion 102 of the pinch drive arm 97 via the T4 arm regulating pin 31.

The loaded mode 2 will now be described with reference to FIGS. 14, 19, 21, 26 and 33.

Figure 26:
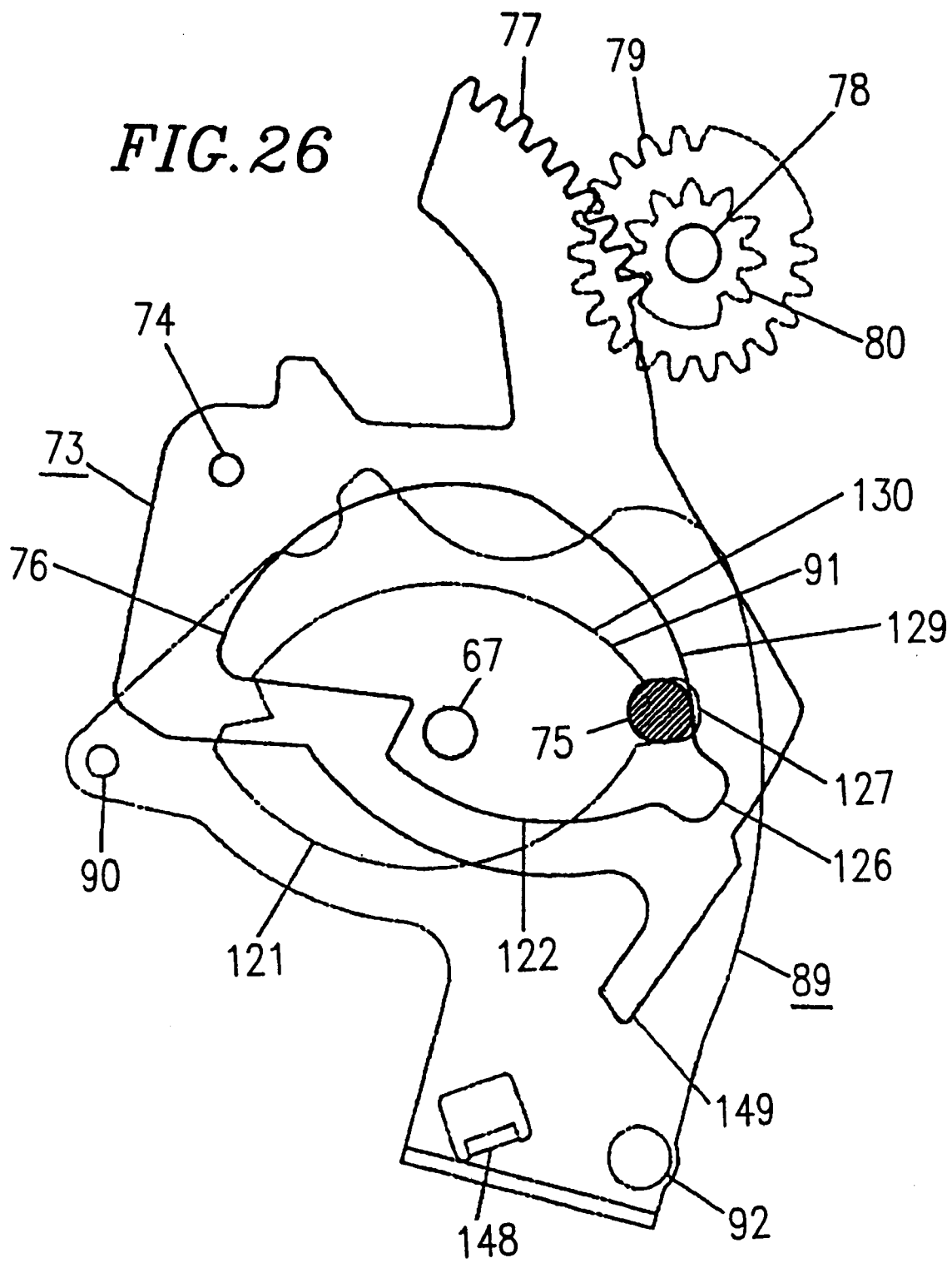
FIG. 26 is a plan view illustrating the relative positions of the boat drive arm and the subchassis drive arm of the magnetic recording/reproduction apparatus in the loaded mode 2.

Referring to FIG. 14, the cassette 1 is moving toward the cylinder 38, and the tape 2 is being wound around the cylinder 38 by the S2 post 44, the S1 post 45, the T1 post 46 and the T2 post 47. While the S boat 39 and the T boat 40 have been moved to their predetermined positions, the tension post 14 and the T4 post 30 are still on their way to the predetermined positions, whereby the predetermined tape driving path for recording/reproducing data to/from the tape 2 has not been complete.

in FIGS. 14, 19 and 26, the drive pin 75 on the cam gear 66 has passed the first arc portion 121 of the subchassis drive arm 89 to be engaged with a depression 127 provided in the inner cam 91. Thus, the subchassis drive arm 89 has started rotating in the counterclockwise direction, with the subchassis 3 being moved toward the cylinder 38 via the guide pin 92.

in the boat drive arm 73, on the other hand, the drive pin 75 has passed the depression 126 provided in the inner cam 91 and is located along a second arc portion 129. While the drive pin 75 is in the depression 126, the drive pin 75 rotates the boat drive arm 73. However, while the drive pin 75 is located along the first arc portion 122 or the second arc portion 129, the boat drive arm 73 stays in a predetermined position.

The boat drive arm 73 is in the farthest rotational position in the counterclockwise direction, and the S boat 39 and the T boat 40 have been moved to their predetermined positions on the main chassis 8 via the gear portion 77, the S load gear 79 and the T load gear 84.

Boat stoppers 141 and 142 are provided on the main chassis 8 for stopping the S boat 39 and the T boat 40 by contacting the S boat 39 and the T boat 40 at their V-shaped portions 143 and 144, respectively (FIG. 19). The S load gear 79 and the S load arm 81 rotate integrally during the movement of the S boat 39. Likewise, the T load gear 84 and the T load arm 86 rotate integrally during the movement of the T boat 40. The S load link 82 and the S load arm 81 are configured so that the S boat 39 reaches a predetermined position at a time slightly before the mode shift from the loaded mode 1 to the loaded mode 2. Likewise, the T load link 87 and the T load arm 86 are configured so that the T boat 40 reaches a predetermined position at a time slightly before the mode shift from the loaded mode 1 to the loaded mode 2. During the remaining time until the start of the loaded mode 2, the boat driving arm 73 rotates the S load gear 79 clockwise and the T load gear 84 counterclockwise. As a result, since the S load gear 79 has rotated slightly relative to the S load arm 81, a torsion coil spring (not shown) resting between the S load gear 79 and the S load arm 81 is twisted. By the repulsive force of the twisted torsion coil spring, the S boat 39 is pressed against the boat stopper 141 and secured thereto. Likewise, since the T load gear 84 has rotated slightly relative to the T load arm 86, a torsion coil spring (not shown) resting between the T load gear 84 and the T load arm 86 is twisted. By the repulsive force of the twisted torsion coil spring, the T boat 40 is pressed against the boat stopper 142 and secured thereto.

In FIGS. 14, 19 and 24, the relative positions of the tension arm 12 and the tension band regulating arm 21 with respect to the subchassis 3 in the loaded mode 1 are maintained unchanged by the tension plate 18 during a tape loading process from the loaded mode 1 until immediately before the play mode. Thus, the relative position of the tension arm 12 with respect to the subahassis 3 is fixed, while the tension band 19 slackens for the cylindrical portion 26 of the S reel base 4 by the pivotal movement of the tension band regulating arm 21 in the clockwise direction so that the S reel base 4 is allowed to rotate.

Referring to FIGS. 14, 19 and 33, along with the movement of the subchassis 3, the pinch arm 53 rotates in the clockwise direction as the protrusion 59 of the pinch arm 53 is pushed by the wall portion 60 of the subchassis 3.

Along with the movement of the subchassis 3, the T4 arm regulating pin 31 on the T4 arm 28 moves from the protrusion 102 of the pinch drive arm 97 onto a T4 guide 145 provided on the main chassis 8.

While the subchassis 3 is moved, the relative position of the T4 arm 28 with respect to the subchassis 3 in the loaded mode 1 is maintained unchanged by the T4 guide 145.

The pre-play mode (immediately before the play mode) will now be described with reference to FIG. 27.

The drive pin 75 on the cam gear 66 has passed the depression 127 of the subchassis drive arm 89 and is located along a second arc portion 130 provided in the inner cam 91.

The subchassis drive arm 89 is in the farthest rotational position in the counterclockwise direction, and the subchassis 3 has been moved to its predetermined position via the guide pin 92. The drive pin 75 is located along the second arc portion 129 of the inner cam 76 of the boat drive arm 73, and the boat drive arm 73 is thus in its position as in the loaded mode 2.

The play mode will now be described with reference to FIGS. 15, 22, 28 and 34.

Referring to FIG. 15, the tape 2 has been pulled out from the cassette 1, thereby completing the tape driving path for recording/reproducing data to/from the tape 2.

The completed tape driving path will be described with reference to FIG. 15.

The tape 2 is pulled out from the tape supply reel (not shown) located on the left side in the cassette 1, and runs around the tension post 14, the S3 post 49 provided on the main chassis 8, the S2 post 44 and the S1 post 45. The tape 2 from the S1 post 45 is wound around the cylinder 38, for a predetermined arc and at a predetermined inclination angle, in conformity with the standard of the tape recording pattern. Past the cylinder 38, the tape 2 runs around the T1 post 46, the T2 post 47 and the T3 post 51, at which time the tape 2 is at the same height as immediately after the cassette 1, without any twist. Then, the tape 2 runs around the capstan 50, which is perpendicular to the tape driving direction, and the T4 post 30, after which the tape 2 runs around the take-up reel (not shown) located on the right in the cassette 1.

The tension post 14, the S3 post 49, the S2 post 44, T2 post 47 and T4 post 30 are perpendicular to the tape driving direction, whereas the S1 post 45, the T1 post 46 and the T3 post 51 are inclined with respect to the tape driving direction.

Figure 27:
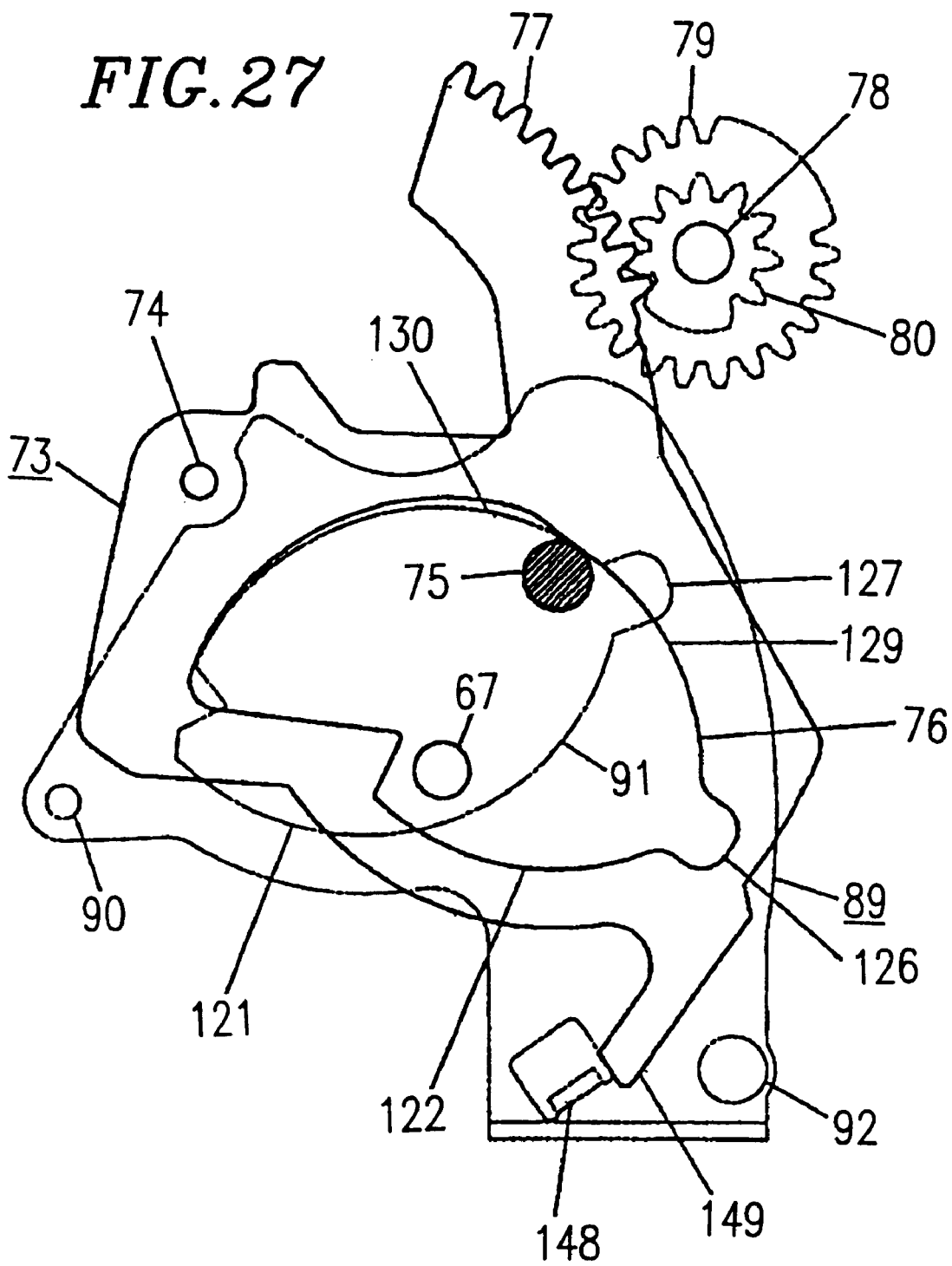
FIG. 27 is a plan view illustrating the relative positions of the boat drive arm and the subchassis drive arm of the magnetic recording/reproduction apparatus in a pre-play mode which is between the loaded mode 2 and the play mode and is close to the loaded mode 2.
Figure 28:
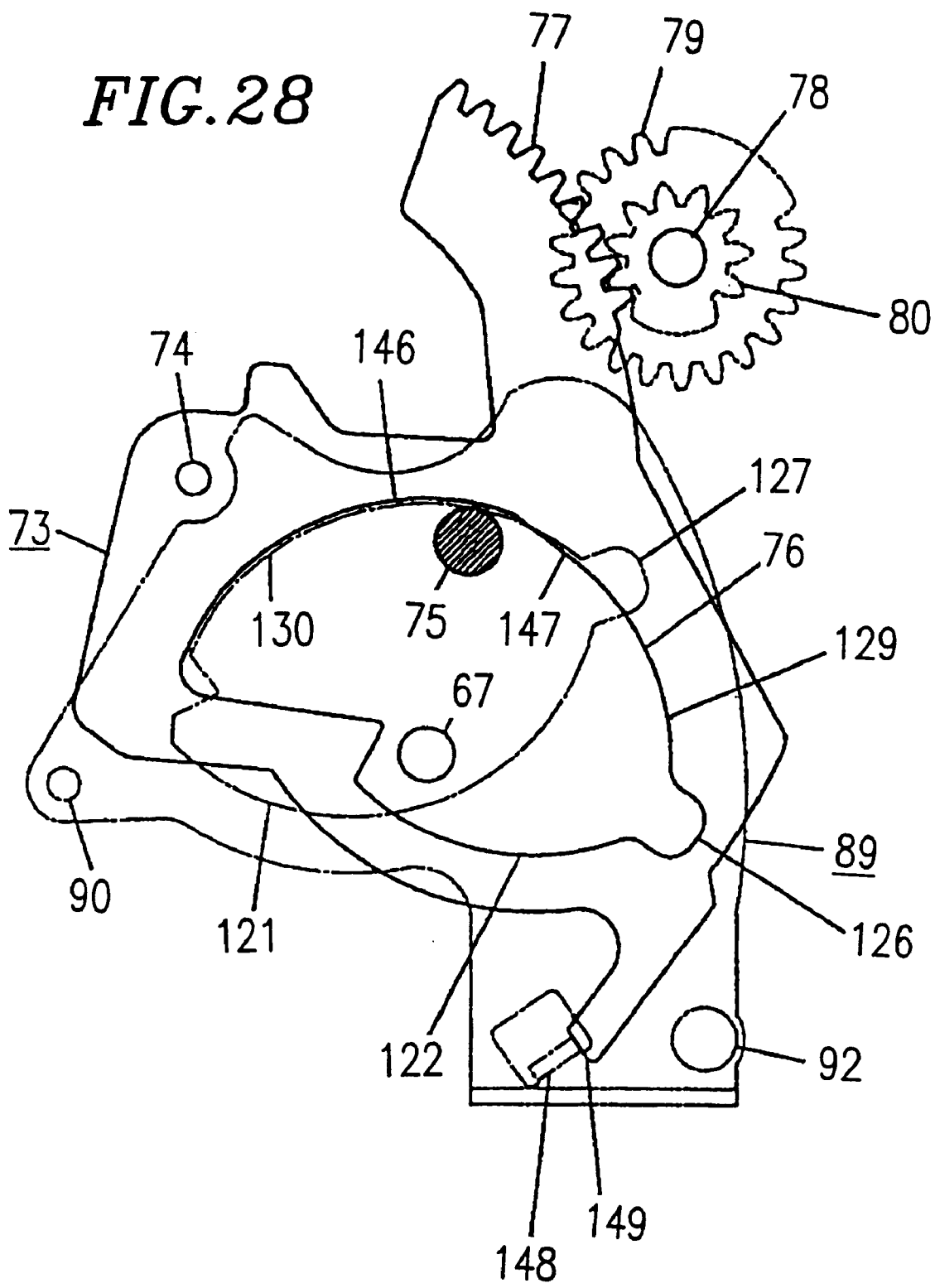
FIG. 28 is a plan view illustrating the relative positions of the boat drive arm and the subchassis drive arm of the magnetic recording/reproduction apparatus in the play mode.

Referring to FIG. 28, the drive pin 75 on the cam gear 66 is located along second arc portion 130 of the subchassis drive arm 89, and the position of the subchassis drive arm 89 is the same as in the pre-play mode, as illustrated in FIG. 27. Thus, the subchassis 3 has been moved completely.

Tn the boat drive arm 73, on the other hand, the drive pin 75 is located along a third arc portion 146 provided in the inner cam 76.

As illustrated in FIG. 5, the third arc portion 146 (indicated by "D") has a radius which is slightly greater than that of the second arc portion 129 (indicated by "C"). A transitional portion 147 (indicated by "E") extends between the second arc portion 129 and the third arc portion 146.

Referring to FIG. 28, the boat drive arm 73 has been slightly rotated in the clockwise direction from the pre-play mode illustrated in FIG. 27, and a boat drive arm stop portion 148 provided in the subchassis drive arm 89 is in contact with a protrusion 149 of the boat drive arm 73. This small amount of return rotation of the boat drive arm 73 occurring between the pre-play mode and the play mode is sufficiently smaller than the rotational phase difference of the S load gear 79 and the S load arm 81 with respect to the T load gear 84 and the T load arm 86. Therefore, the press-fit connection of the S boat 39 and the T boat 40 onto the boat stoppers 141 and 142 is maintained.

Thus, in the play mode and thereafter, the reacting force from the press-fit connection of the S boat 39 and the T boat 40 is maintained by the boat drive arm stop portion 148, not by the drive pin 75, whereby the position of the boat drive arm 73 is determined by the boat drive arm stop portion 148, not by the drive pin 75.

in FIGS. 15 and 22, the tension arm regulating pin 15 is located at a top free section 150 at the upper end of the cam groove 63.

The tension plate 18 is not in contact with the tension arm regulating pin 15.

The pin 25 provided in the tension band regulating arm 21 is located along an upper depression 151 of the right edge cam 72 of the tension plate 18, and the position of the tension band regulating arm 21 on the subchassis 3 is determined by contacting the tension arm stop plate 116 as in the unloaded mode.

The tension arm 12 is positioned by the tension band 19 being wound around the cylindrical portion 26 of the S reel base 4 without slack by virtue of the tension provided by the tension spring 27. As a frictional force is generated between the tension band 19 and the cylindrical portion 26 of the S reel base 4, and the tape 2 runs around the tension post 14 while being wound therearound under tension, a feedback control is provided for the frictional force so as to stably maintain the tape tension.

The position of the tension post 14 in the play mode can thus be adjusted by moving the tension arm stop plate 116 and fixing it with a screw (not shown).

Referring to FIG. 34, in the play mode, the pinch drive arm 97 is pivoted in the clockwise direction by the pinch cam gear 95, and a pressing cam portion 281 on the pinch drive arm 97 presses the roller 152 axially supported on the pinch press arm 56, whereby the twisted coil spring 57 presses the pinch roller 55 onto the capstan 50 via the tape 2. Thus, the tape 2 is driven by the rotation of the capstan 50.

The position of the T4 arm 28 is maintained by the T4 guide 145.

Figure 29:
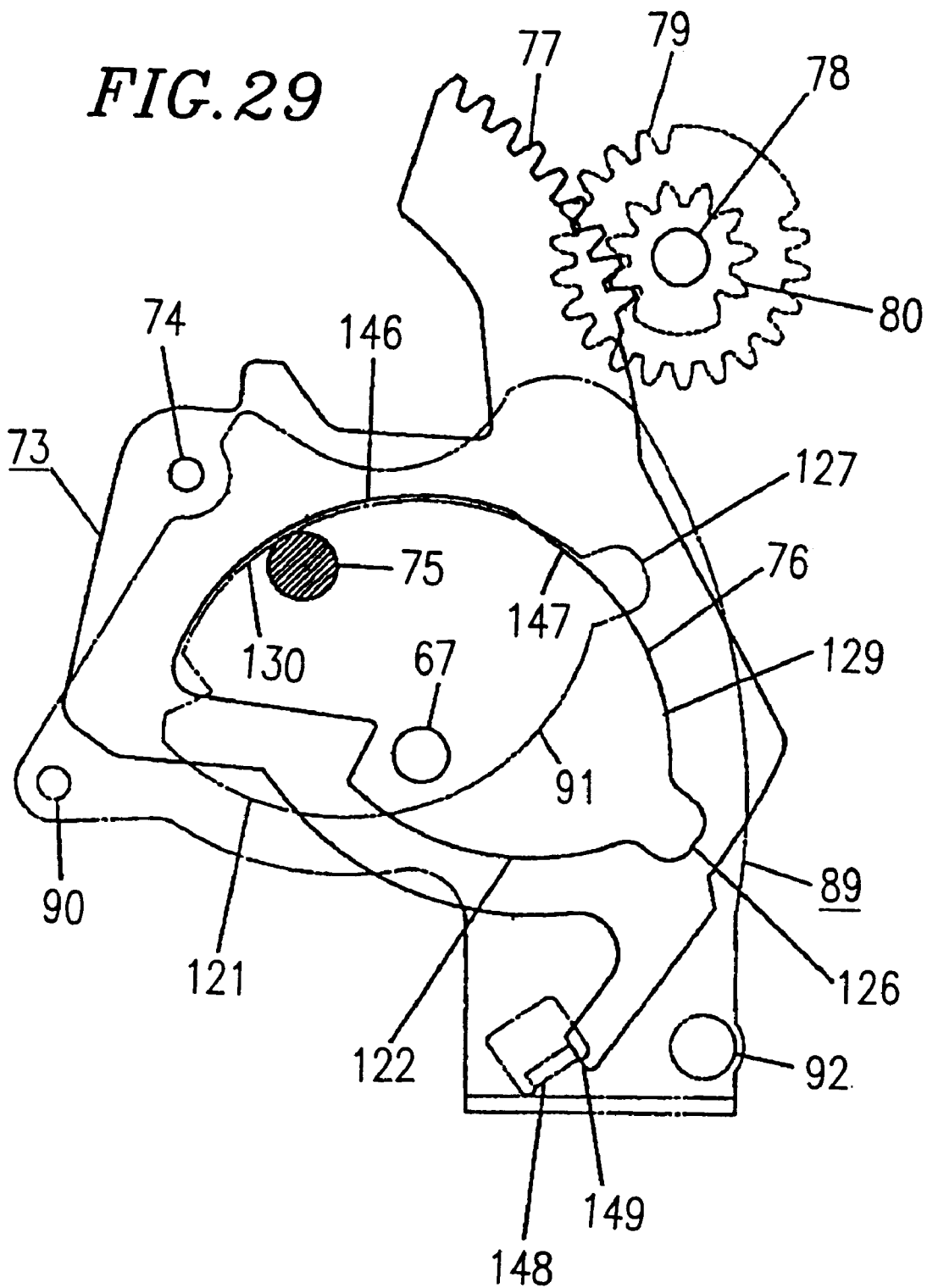
FIG. 29 is a plan view illustrating the relative positions of the boat drive arm and the subchassis drive arm of the magnetic recording/reproduction apparatus in the stop mode.

The stop mode will now be described with reference to FIGS. 16, 23, 29 and 35.

in FIG. 29, the positions of the subchassis drive arm 89 and the boat drive arm 73 are the same as those in the play mode (see FIG. 28), except that the position of the drive pin 75 on the cam gear 66 is different.

Referring to FIGS. 16 and 23, the tension plate 18 is slightly moved toward the rear side by the tension plate drive arm 64 from the play mode (see FIG. 22). The relative positions of the tension arm 12 and the tension band regulating arm 21 with respect to the subchassis 3 are the same as those in the loaded mode 1 and the loaded mode 2.

Referring to FIG. 29, the subchassis drive arm 89 and the boat drive arm 73 are in the same state as that in the play mode (see FIG. 28), with only the drive pin 75 on the cam gear 66 being moved.

Figure 35:
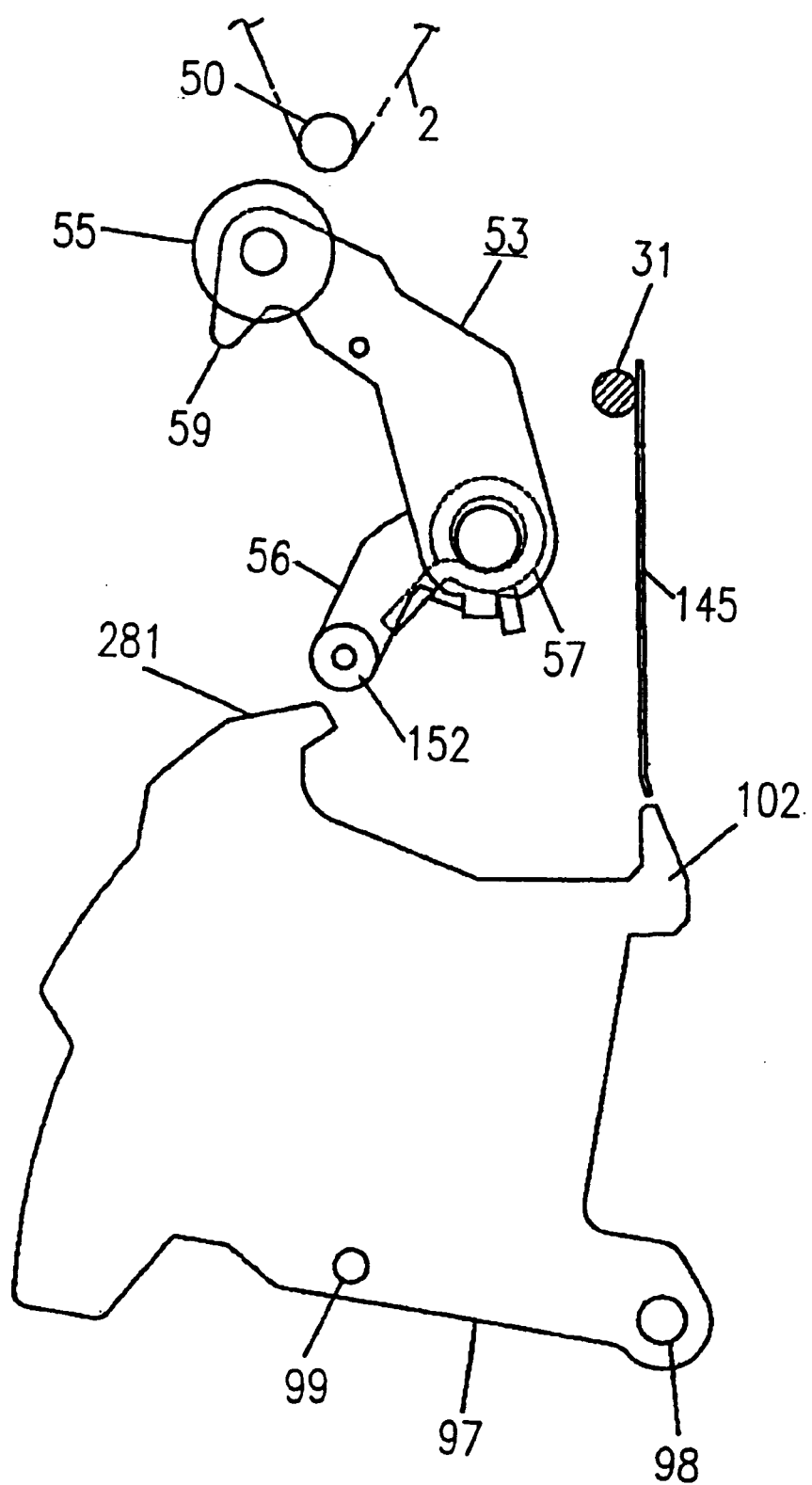
FIG. 35 is a plan view illustrating the relative positions of the pinch arm and the T4 arm of the magnetic recording/reproduction apparatus in the stop mode.

Referring to FIGS. 16 and 35, the pinch drive arm 97 is rotated in the counterclockwise direction and is not in contact with the roller 152 of the pinch press arm 56. The pinch arm 53 is biased in the counterclockwise direction by the tension spring 58 and is in contact with the wall portion 60 of the subchassis 3. In this position, the pinch roller 55 and the capstan 50 are spaced apart from each other.

The reverse mode will now be described with reference to FIGS. 17, 23, 30 and 34.

Figure 30:
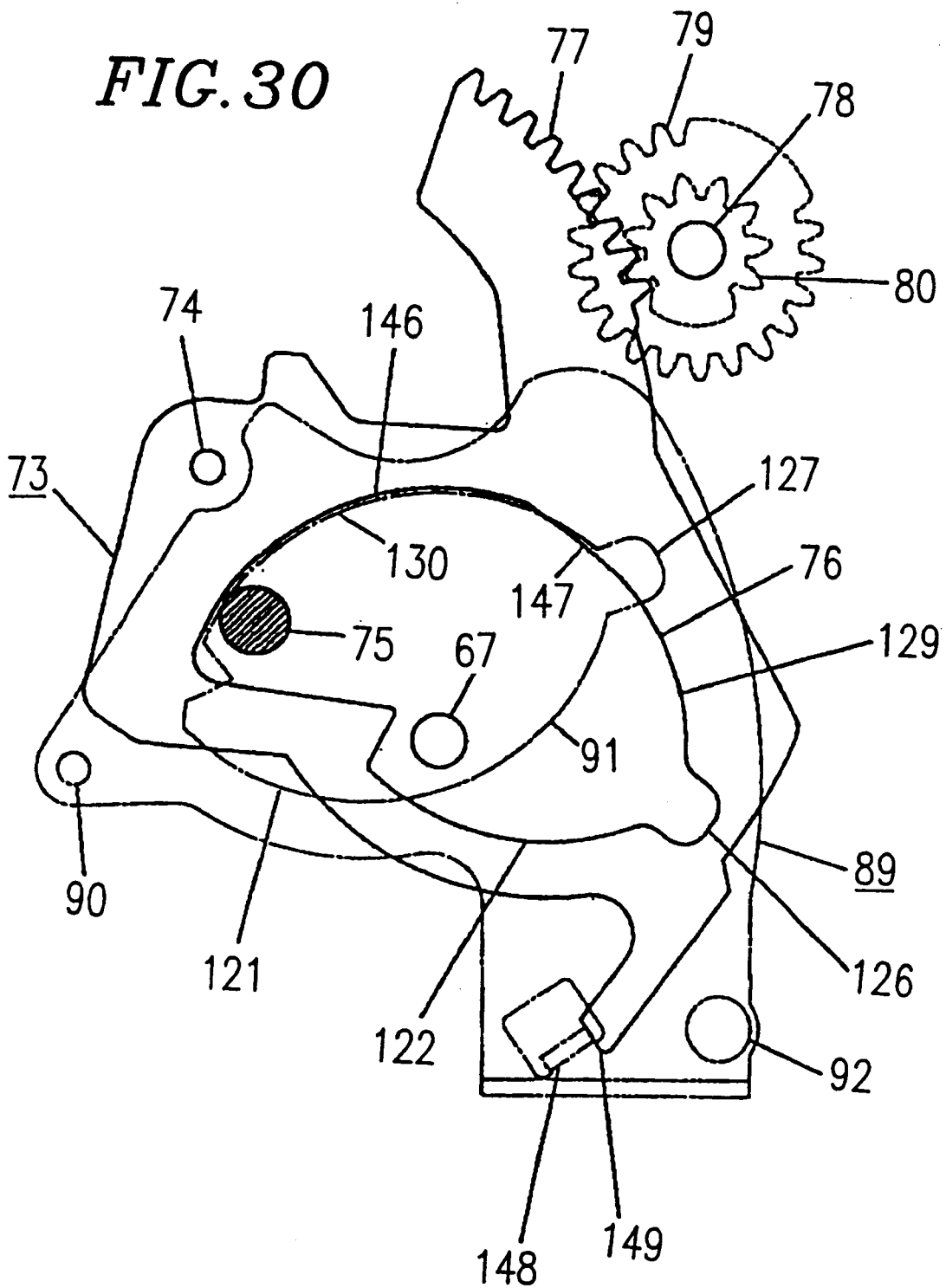
FIG. 30 is a plan view illustrating the relative positions of the boat drive arm and the subchassis drive arm of the magnetic recording/reproduction apparatus in the reverse mode.

Referring to FIG. 30, the positions of the subchassis drive arm 89 and the boat drive arm 73 are the same as those in the play mode (see FIG. 28) and the stop mode (see FIG. 29), with only the drive pin 75 on the cam gear 66 being moved.

The tension plate 18 does not move from its position in the stop mode, and the positions of the tension arm 12 and the tension band regulating arm 21 are the same as those in the stop mode, as illustrated in FIG. 23.

The pinch drive arm 97 is rotated again in the clockwise direction from the stop mode, as illustrated in FIG. 35, to the same position as in the play mode, as illustrated in FIG. 34, whereby the pinch arm 53 is in the same state as in the play mode. The T4 arm 28 stays in the same state as in the play mode, in the stop mode and in the reverse mode.

Figure 40B:
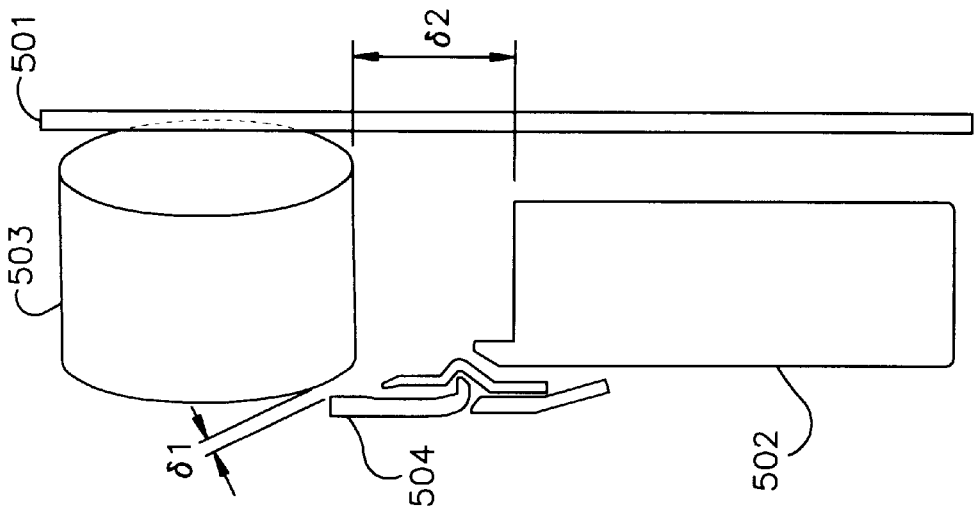
FIG. 40B is a side view illustrating the positional relationship between the cylinder and the cassette of the conventional magnetic recording/reproduction apparatus.
Figure 40A:
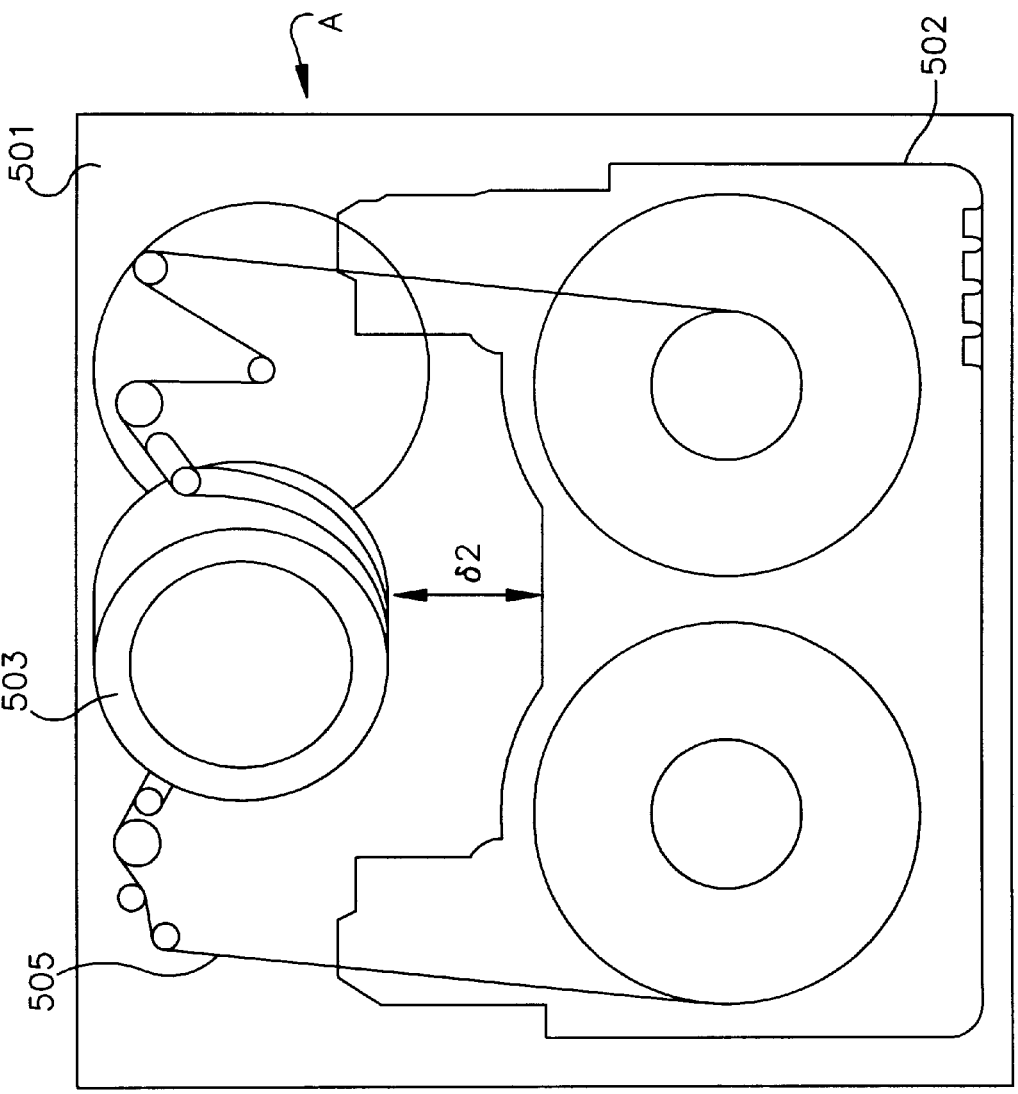
FIG. 40A is a plan view illustrating the positional relationship between a cylinder and a cassette of a conventional magnetic recording/reproduction apparatus.
Figure 41B:
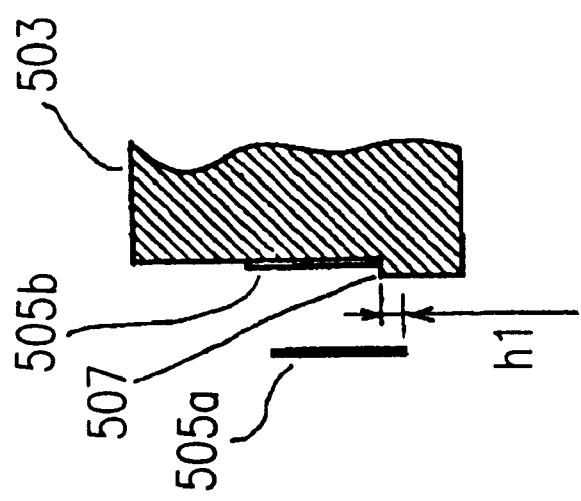
FIG. 41B is a side view illustrating the elevation of a tape with respect to the cylinder of the conventional magnetic recording/reproduction apparatus.
Figure 41A:
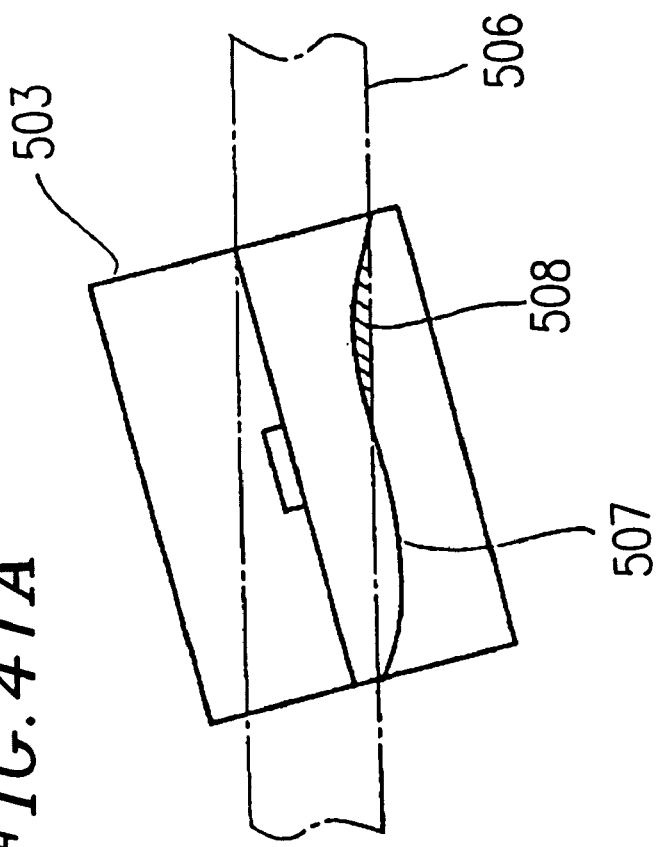
FIG. 41A is a front view illustrating an elevation of a tape with respect to the cylinder of the conventional magnetic recording/reproduction apparatus.

As illustrated in FIG. 15, in the present embodiment of the invention, the T3 post 51, which is an inclined post, is added to the tape drive system illustrated in FIG. 40A. Therefore, the tape 2 runs at a lower elevation than in the M loading tape path as illustrated in FIG. 40A in the vicinity of the downstream side (the right side in FIG. 15) of the cylinder 38.

Figure 36:
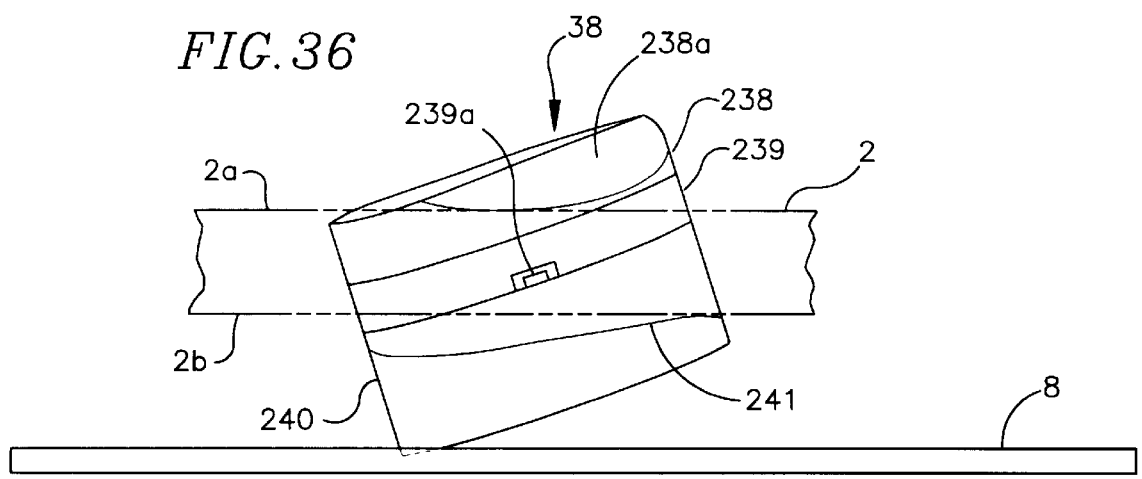
FIG. 36 is a front view illustrating an elevation of a magnetic tape with respect to a cylinder of the magnetic recording/reproduction apparatus.

FIG. 36 illustrates the magnetic recording/reproductton apparatus shown in FIG. 15 as viewed from the direction indicated by an arrow 160.

Referring to FIG. 36. the cylinder 36 includes an upper fixed cylinder 238, an intermediate rotary cylinder 239 and a lower fixed cylinder 240.

The upper fixed cylinder 238 includes a cut-out portion 238a. The intermediate rotary cylinder 239 includes a rotary head 239a provided integrally therewith, and rotates at a predetermined speed. The lower fixed cylinder 240 includes a lead 241, which is a stepped portion, for guiding the tape 2.

in FIG. 36, two dot chain lines 2a and 2b indicate the elevation of the tape 2 within the cassette 1. The lower two dot chain line 2b is on or above the lead 241, whereby the tape 2 would not be hooked on the lead 241 during the loading/unloading operation.

Figure 37:
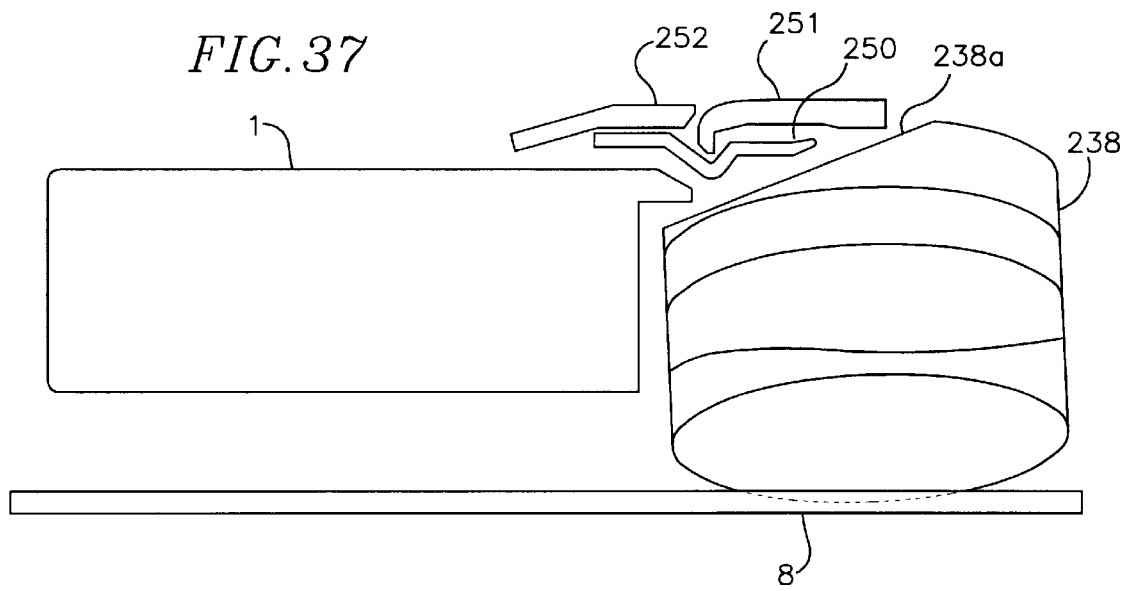
FIG. 37 is a side view illustrating the positional relationship between the cylinder and the cassette of the magnetic recording/reproduction apparatus.

FIG. 37 illustrates the magnetic recording/reproduction apparatus shown in FIG. 15 as viewed from the direction indicated by an arrow 161.

Referring to FIG. 37, the cassette 1 includes a cassette lid components 250, 251 and Z52.

As the upper fixed cylinder 238 includes the cut-out portion 238a, the cassette 1 can be placed closer to the cylinder 38 and can be positioned above the cylinder 38. Therefore, the size of the magnetic recording/reproduction apparatus of the present embodiment can be reduced from that of the magnetic recording/reproduction apparatus shown in FIG. 40A.

Figure 38:
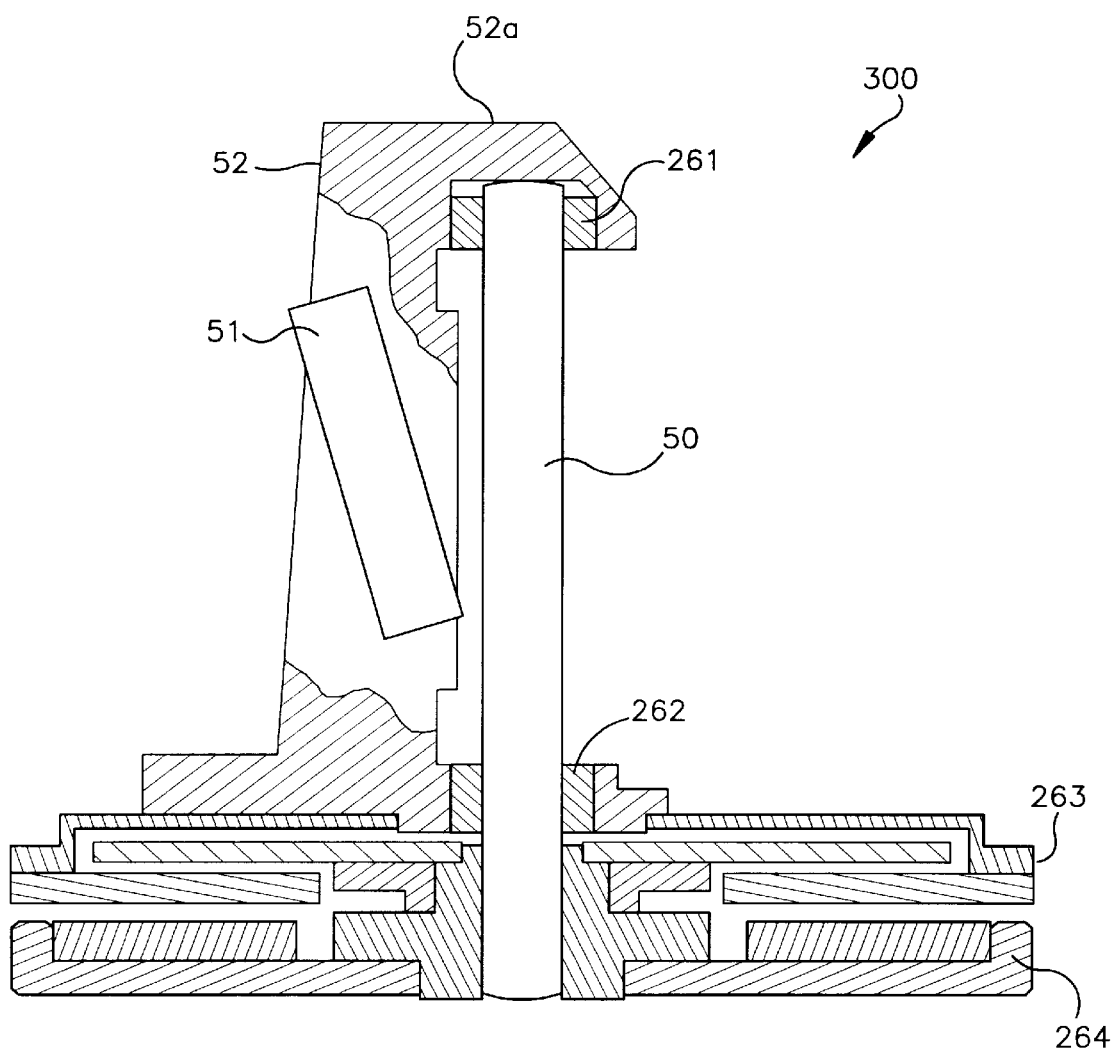
FIG. 38 is a side view illustrating a capstan housing and the T3 post of the magnetic recording/reproduction apparatus.

FIG. 38 illustrates a capstan motor unit 300 including the capstan 50 shown in FIG. 15 as viewed from the direction indicated by an arrow 162.

The capstan motor unit 300 includes the capstan 50, the T3 post 51, the capstan housing 52, bearings 261 and 262, a stator 263 of the motor, and a rotor 264 of the motor which rotates integrally the capstan 50.

The capstan 50 is received by the bearings 261 and 262 which are fixed to the capstan housing 52.

The T3 post 51 is fixed (e.g., bonded) to the capstan housing 52. Thus, the T3 post 51 has no supporting member for itself, whereby the T3 post 51 can be provided in the immediate vicinity of the capstan 50 with a minimum gap therebetween.

in the cylinder 38 illustrated in FIG. 36, it is required that the shape of the lead 241, the elevation of the rotary head 239a with respect to the lead 241, etc., are made with a very high dimensional accuracy. Therefore, even a slight amount of external force should not be applied onto the cylinder 38.

Figure 39:
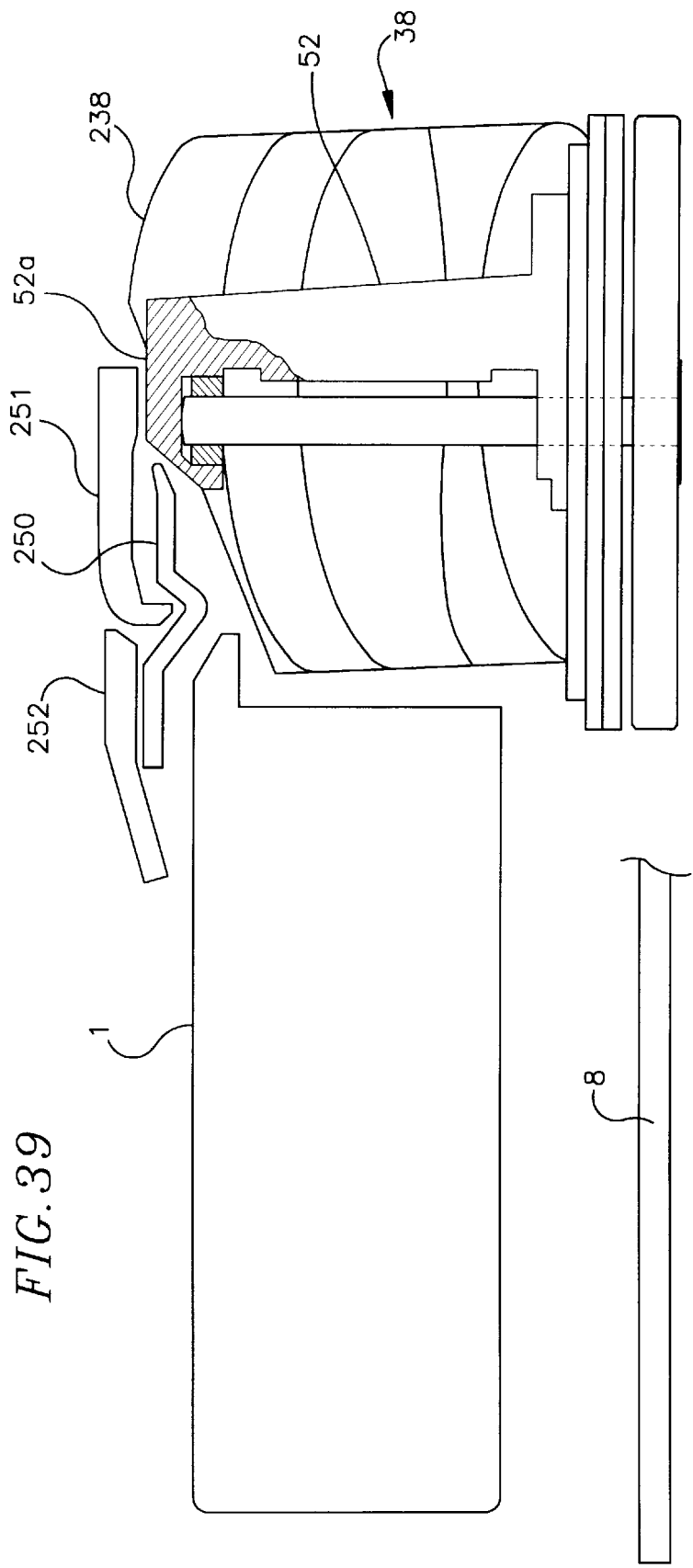
FIG. 39 is a side view illustrating the positional relationship among the cylinder, the cassette and the capstan housing of the magnetic recording/reproduction apparatus.

FIG. 39 illustrates the cylinder 38, the capstan housing 52 and the cassette 1, etc., shown in FIG. 15 as viewed from the direction indicated by the arrow 161.

When the cassette lid components 250 and 251 are downwardly biased due to deformation, or the like, the cassette lid components 250 and 251 contact, and are stopped by, an upper portion 52a of the capstan housing 52. Therefore, the cassette lid components 250 and 251 do not contact the upper fixed cylinder 238, thereby substantially eliminating a possibility that the dimensional accuracy of the cylinder 38 is deteriorated or lost by contact with the cassette lid components 250 and 251.

The magnetic recording/reproduction apparatus of the present invention includes the upper fixed cylinder, the intermediate rotary cylinder having the rotary head and the lower fixed cylinder. The upper end of the upper fixed cylinder is cut off at a predetermined angle so that the cassette lid provided over the opening of the tape cassette does not interfere with the upper fixed cylinder in the tape driving state.

Therefore, it is possible to minimize the gap between the cylinder and the cassette. Moreover, as the tape path is shortened, the entire mechanism of the magnetic recording/reproduction apparatus can be made smaller.

The tape driving state is achieved by mounting the tape cassette onto the first base member, moving the first base member toward the rotary head cylinder, pulling out the magnetic tape from the tape cassette by means of a tape guide member, and winding the magnetic tape around the rotary head cylinder, for a predetermined arc, thereby forming a tape drive system to allow the magnetic tape to be recorded/reproduced.

Due to such a tape drive system, it is possible to prevent the magnetic tape from being damaged by the lead section of the cylinder during the loading operation of pulling out the magnetic tape from the tape cassette or the unloading operation of pulling the magnetic tape back into the tape cassette.

In another magnetic recording/reproduction apparatus of the present invention, the third inclined post is formed integrally with a capstan housing which serves as a bearing member for receiving the capstan shaft.

Therefore, it is not necessary to provide the third inclined post supporting member in a separate position, whereby the entire mechanism of the magnetic recording/reproduction apparatus can be downsized.

in still another magnetic recording/reproduction apparatus of the present invention, a stop member is provided in an upper portion of a capstan housing which serves as a bearing member for receiving the capstan shaft, the stop member prevents the cassette lid from contacting the upper fixed cylinder which may otherwise occur when the cassette lid lowers toward the bottom side of the tape cassette.

Thus, in the still another magnetic recording/reproduction apparatus of the present invention, the cassette lid component does not contact the upper fixed cylinder even when the cassette lid is not opened by another mechanism or when the cassette lid component is deformed due to a harsh storage condition, or the like.

A further magnetic recording/reproduction apparatus of the present invention includes: a first vertical post holding arm for holding the first vertical post, the first vertical post holding arm having its pivotal shaft on the first base member; a fifth vertical post holding arm for holding the fifth vertical post, the fifth vertical post holding arm having its pivotal shaft on the first base member; a first tape guide member carrier on which the third vertical post and the first inclined post are mounted; a second tape guide member carrier on which the fourth vertical post and the second inclined post are mounted; a guide section for guiding the first tape guide member carrier and the second tape guide member carrier to the second base member; and a pinch arm pivotally supported on the second base member, the pinch arm having a pinch roller for pressing the magnetic tape against the capstan shaft. The second vertical post and the third inclined post are provided integrally with the second base member Therefore, the magnetic recording/reproductlon apparatus can be downsized while ensuring the reliability of a tape loading operation. Moreover, since the pinch arm is pivotally supported on the second base member, the first base member is not subject to the reacting force from the capstan while the pinch roller is pressed against the capstan.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording/reproduction apparatus for pulling out a magnetic tape from a tape cassette and winding the magnetic tape around a rotary head cylinder, having a rotary head, for a predetermined arc, for recording/reproducing the magnetic tape, the magnetic recording/reproduction apparatus comprising:

a rotary head cylinder;

a first base member on which the tape cassette is mounted;

a second base member for guiding a reciprocal movement of the first base member toward/away from the rotary head cylinder;

first to fifth vertical posts for guiding the magnetic tape, wherein a winding contact line, along which the magnetic tape contacts each of the first to fifth vertical posts, is perpendicular to a tape driving direction in which the magnetic tape is driven; and first to third inclined posts for guiding the magnetic tape, wherein a winding contact line, along which the magnetic tape contacts each of the first to third inclined posts, is not perpendicular to the tape driving direction, wherein:

in a tape driving state in which the magnetic tape can be driven, the magnetic tape pulled out from a supply reel is wound around the first vertical post on a non-magnetic side thereof, around the second vertical post on a magnetic side thereof. around the third vertical post on the non-magnetic side thereof, around the first inclined post on the non-magnetic side thereof, around the rotary head cylinder on the magnetic side thereof, around the second inclined post on the non-magnetic side thereof, around the fourth vertical post on the non-magnetic side thereof, around the third inclined post on the magnetic side thereof, around a capstan shaft for driving the magnetic tape on the magnetic side thereof, and around the fifth vertical post on the non-magnetic side thereof, thereby reaching a take-up reel;

the rotary head cylinder includes an upper fixed cylinder, an intermediate rotary cylinder having the rotary head and a lower fixed cylinder;

the upper fixed cylinder, the intermediate rotary cylinder and the lower fixed cylinder are coaxially aligned with respect to one another;

an upper portion of the upper fixed cylinder is cut off so that a cassette lid provided over an opening of the tape cassette does not interfere with the upper fixed cylinder in the tape driving state; and the tape driving state is achieved by mounting the tape cassette onto the first base member, moving the first base member toward the rotary head cylinder, pulling out the magnetic tape from the tape cassette by means of a tape guide member, and winding the magnetic tape around the rotary head cylinder, for a predetermined arc, thereby forming a tape drive system to allow the magnetic tape to be recorded/reproduced.

2. A magnetic recording/reproduction apparatus according to claim 1, wherein the third inclined post is formed integrally with a capstan housing which serves as a bearing member for receiving the capstan shaft.

3. A magnetic recording/reproduction apparatus according to claim 1, wherein a stop member is provided in an upper portion of a capstan housing which serves as a bearing member for receiving the capstan shaft, the stop member preventing the cassette lid from contacting the upper fixed cylinder.

4. A magnetic recording/reproduction apparatus according to claim 1, further comprising:

a first vertical post holding arm for holding the first vertical post, the first vertical post holding arm having its pivotal shaft on the first base member;

a fifth vertical post holding arm for holding the fifth vertical post, the fifth vertical post holding arm having its pivotal shaft on the first base member;

a first tape guide member carrier on which the third vertical post and the first inclined post are mounted;

a second tape guide member carrier on which the fourth vertical post and the second inclined post are mounted, wherein the first tape guide member carrier is guided by a first guiding section provided integrally with the second base member, and also the second tape guide member carrier is guided by a second guiding section provided integrally with the second base member; and a pinch arm pivotally supported on the second base member, the pinch arm having a pinch roller for pressing the magnetic tape against the capstan shaft, wherein the second vertical post and the third inclined post are provided integrally with the second base member.

* * * * *